United States Patent
Gervais

(10) Patent No.: US 12,140,917 B2
(45) Date of Patent: Nov. 12, 2024

(54) TRAINING SERVER AND METHOD FOR GENERATING A PREDICTIVE MODEL FOR CONTROLLING AN APPLIANCE

(71) Applicant: Distech Controls Inc., Brossard (CA)

(72) Inventor: Francois Gervais, Lachine (CA)

(73) Assignee: DISTECH CONTROLS INC., Brossard (CA)

(*) Notice: Subject to any disclaimer, the term of this patent is extended or adjusted under 35 U.S.C. 154(b) by 1065 days.

(21) Appl. No.: 15/914,610

(22) Filed: Mar. 7, 2018

(65) Prior Publication Data

US 2019/0278242 A1    Sep. 12, 2019

(51) Int. Cl.
*G05B 19/042*    (2006.01)
*F24F 11/63*    (2018.01)
(Continued)

(52) U.S. Cl.
CPC ............ *G05B 19/042* (2013.01); *F24F 11/63* (2018.01); *G06N 3/08* (2013.01); *G06N 5/022* (2013.01);
(Continued)

(58) Field of Classification Search
CPC ........... G05B 19/042; G05B 2219/2614; F24F 11/63; F24F 11/30; G06N 3/08; G06N 5/022; G06N 5/04
See application file for complete search history.

(56) References Cited

U.S. PATENT DOCUMENTS 5,257,735 A   11/1993   Takahashi et al.
7,156,316 B2   1/2007   Kates
(Continued)

FOREIGN PATENT DOCUMENTS

CN   114811833 A  *  7/2022
WO   2017076433 A1    5/2017
WO   2018200225 A1   11/2018

OTHER PUBLICATIONS

Chen, Y., Shi, Y. and Zhang, B., Oct. 2017, Modeling and optimization of complex building energy systems with deep neural networks. In 2017 51st Asilomar Conference on Signals, Systems, and Computers (pp. 1368-1373). IEEE. (Year: 2017).*

(Continued)

*Primary Examiner* — Alicia M. Choi
(74) *Attorney, Agent, or Firm* — Buchanan Ingersoll & Rooney PC

(57) ABSTRACT

Method and training server for generating a predictive model for the control of an appliance by an environment controller. The predictive model allows a neural network inference engine to infer output(s) based on inputs. The training server receives room characteristic(s), current environmental characteristic value(s), and set point(s) from the environment controller. The training server determines command(s) for controlling the appliance based on the current environmental characteristic value(s), the set point(s) and the room characteristic(s). Each command is executed by the controlled appliance. The training server receives updated environmental characteristic value(s) and determines a reinforcement signal based on the set point(s), the updated environmental characteristic value(s), and a set of rules. The training server executes a neural network training engine to update the predictive model based on: inputs (the current environmental characteristic value(s), the set point(s), and the room characteristic(s)); output(s) (the command(s)); and the reinforcement signal.

18 Claims, 13 Drawing Sheets

(51) Int. Cl.
*G06N 3/08* (2023.01)
*G06N 5/022* (2023.01)
*G06N 5/04* (2023.01)

(52) U.S. Cl.
CPC ....... *G06N 5/04* (2013.01); *G05B 2219/2614* (2013.01)

(56) References Cited

U.S. PATENT DOCUMENTS

| | | |
|---|---|---|
| 7,206,670 B2 | 4/2007 | Pimputkar et al. |
| 7,839,275 B2 | 11/2010 | Spalink et al. |
| 7,840,310 B2 | 11/2010 | Orfield |
| 7,904,209 B2 | 3/2011 | Podgorny et al. |
| 8,010,237 B2 | 8/2011 | Cheung et al. |
| 8,412,654 B2 | 4/2013 | Montalvo |
| 8,457,796 B2 | 6/2013 | Thind |
| 8,849,471 B2 | 9/2014 | Daniel et al. |
| 8,925,358 B2 | 1/2015 | Kasper et al. |
| 9,002,761 B2 | 4/2015 | Montalvo |
| 9,046,896 B1 | 6/2015 | Brunelle |
| 9,190,844 B2 | 11/2015 | Tran |
| 9,285,134 B2 | 3/2016 | Bray |
| 9,477,239 B2 | 10/2016 | Bergman et al. |
| 9,536,421 B2 | 1/2017 | Singhar et al. |
| 9,594,384 B2 | 3/2017 | Bergman et al. |
| 9,651,929 B2 | 5/2017 | Horesh et al. |
| 9,661,121 B2 | 5/2017 | Singhar et al. |
| 9,671,843 B2 | 6/2017 | Ellis et al. |
| 9,905,122 B2 | 2/2018 | Sloo et al. |
| 10,094,586 B2 | 10/2018 | Pavlovski et al. |
| 10,107,511 B2 | 10/2018 | Boulbes et al. |
| 10,360,779 B2 | 7/2019 | Correnti |
| 10,373,082 B2 | 8/2019 | Henze et al. |
| 10,523,449 B2 | 12/2019 | Montalvo |
| 10,616,121 B2 | 4/2020 | Gervais |
| 10,838,375 B2 | 11/2020 | Gervais et al. |
| 10,845,768 B2 | 11/2020 | Gervais et al. |
| 10,895,853 B2 | 1/2021 | Gervais |
| 10,897,374 B2 | 1/2021 | Choi et al. |
| 10,908,561 B2 | 2/2021 | Gervais |
| 2002/0144537 A1 | 10/2002 | Sharp et al. |
| 2003/0160103 A1 | 8/2003 | Guo |
| 2007/0114292 A1 | 5/2007 | Breed et al. |
| 2007/0114492 A1 | 5/2007 | Cheong et al. |
| 2007/0119958 A1 | 5/2007 | Kates |
| 2008/0001712 A1 | 1/2008 | Agarwal et al. |
| 2008/0281472 A1 | 11/2008 | Podgorny et al. |
| 2009/0025408 A1* | 1/2009 | Matsui ............... F24F 11/30 62/515 |
| 2010/0088261 A1* | 4/2010 | Montalvo ............. H02J 3/14 706/15 |
| 2011/0113360 A1 | 5/2011 | Johnson et al. |
| 2011/0166712 A1 | 7/2011 | Kramer et al. |
| 2011/0295430 A1 | 12/2011 | Kouninski |
| 2012/0144057 A1 | 6/2012 | Meredith et al. |
| 2012/0245740 A1 | 9/2012 | Raestik et al. |
| 2013/0013121 A1 | 1/2013 | Henze et al. |
| 2014/0277757 A1 | 9/2014 | Wang et al. |
| 2014/0321839 A1 | 10/2014 | Armstrong |
| 2015/0248118 A1 | 9/2015 | Li et al. |
| 2015/0276253 A1 | 10/2015 | Montalvo |
| 2015/0276508 A1 | 10/2015 | Smullin |
| 2015/0293504 A1 | 10/2015 | Blum et al. |
| 2015/0296594 A1 | 10/2015 | Blum et al. |
| 2015/0330923 A1 | 11/2015 | Smullin |
| 2015/0369503 A1 | 12/2015 | Flaherty et al. |
| 2016/0091904 A1 | 3/2016 | Horesh et al. |
| 2016/0223215 A1* | 8/2016 | Buda ............... G05D 23/1917 |
| 2016/0223218 A1* | 8/2016 | Barrett ............... F24F 11/30 |
| 2016/0358459 A1 | 12/2016 | Singhar et al. |
| 2017/0108236 A1 | 4/2017 | Guan et al. |
| 2017/0227950 A1* | 8/2017 | Kinoshita ....... G06Q 10/063118 |
| 2017/0364829 A1* | 12/2017 | Fyffe ............... G06N 3/006 |
| 2018/0017947 A1 | 1/2018 | Kupa et al. |
| 2018/0100662 A1* | 4/2018 | Farahmand ........ G05B 19/0428 |
| 2018/0195911 A1 | 7/2018 | Kakade et al. |
| 2018/0268220 A1 | 9/2018 | Lee et al. |
| 2018/0299153 A1 | 10/2018 | Ajax et al. |
| 2018/0300621 A1* | 10/2018 | Shah ............... G06N 3/044 |
| 2018/0306459 A1 | 10/2018 | Turney |
| 2018/0328967 A1 | 11/2018 | Lange et al. |
| 2018/0363933 A1 | 12/2018 | Ross |
| 2018/0364654 A1 | 12/2018 | Locke et al. |
| 2018/0367320 A1 | 12/2018 | Montalvo |
| 2018/0367483 A1 | 12/2018 | Rodriguez et al. |
| 2018/0375444 A1 | 12/2018 | Gamroth |
| 2019/0017719 A1 | 1/2019 | Sinha et al. |
| 2019/0126472 A1 | 5/2019 | Tunyasuvunakool et al. |
| 2019/0140856 A1 | 5/2019 | Choi et al. |
| 2019/0179269 A1 | 6/2019 | Gervais et al. |
| 2019/0179270 A1 | 6/2019 | Gervais |
| 2019/0182069 A1 | 6/2019 | Gervais |
| 2019/0309978 A1 | 10/2019 | Song et al. |
| 2019/0316802 A1 | 10/2019 | Alanquar et al. |
| 2020/0025401 A1 | 1/2020 | Cheon et al. |
| 2020/0050178 A1* | 2/2020 | Gao ............... G05B 19/4155 |
| 2021/0088987 A1 | 3/2021 | Gervais |
| 2021/0096519 A1 | 4/2021 | Gervais |

OTHER PUBLICATIONS

Wang, Y., Velswamy, K. and Huang, B., 2017. A long-short term memory recurrent neural network based reinforcement learning controller for office heating ventilation and air conditioning systems. Processes, 5(3), p. 46. (Year: 2017).*
Kalogirou, S.A., 2000. Applications of artificial neural-networks for energy systems. Applied energy, 67(1-2), pp. 17-35. (Year: 2000).*
Wei, T., Wang, Y. and Zhu, Q., Jun. 2017, Deep reinforcement learning for building HVAC control. In Proceedings of the 54th annual design automation conference 2017 (pp. 1-6). (Year: 2017).*
Ryu, S.H. and Moon, H.J., 2016. Development of an occupancy prediction model using indoor environmental data based on machine learning techniques. Building and Environment, 107, pp. 1-9. (Year: 2016).*
Hafner, R. and Riedmiller, M., 2011. Reinforcement learning in feedback control. Machine learning, 84(1), pp. 137-169. (Year: 2011).*
Barrett, E. and Linder, S., 2015. Autonomous hvac control, a reinforcement learning approach. In Machine Learning and Knowledge Discovery in Databases: European Conference, ECML PKDD 2015, Porto, Portugal, Sep. 7-11, 2015, Proceedings, Part III 15 (pp. 3-19). Springer International Publishing. (Year: 2015).*
Non Final Office Action for U.S. Appl. No. 17/117,928, mailed Jun. 24, 2022, 21 pages.
Notice of Allowance for U.S. Appl. No. 17/069,233, mailed Aug. 18, 2022, 17 pages.
Notice of Allowance for U.S. Appl. No. 17/067,060, mailed Aug. 31, 2022, 14 pages.
Entire patent prosecution history of U.S. Appl. No. 15/839,068, filed Dec. 12, 2017.
Non Final Office Action for U.S. Appl. No. 17/069,233, mailed Mar. 28, 2022, 16 pages.
Entire patent prosecution history of U.S. Appl. No. 15/839,055, filed Dec. 12, 2017.
Non Final Office Action for U.S. Appl. No. 17/067,060, mailed Mar. 30, 2022, 17 pages.
Entire patent prosecution history of U.S. Appl. No. 15/839,108, filed Dec. 12, 2017.
Entire patent prosecution history of U.S. Appl. No. 15/839,092, filed Dec. 12, 2017.
Non Final Office Action for U.S. Appl. No. 17/116,514, mailed Oct. 13, 2022, 30 pages.
Non Final Office Action for U.S. Appl. No. 17/117,928, mailed Oct. 13, 2020, 16 pages.
Notice of Allowance for U.S. Appl. No. 17/116,514, mailed Apr. 19, 2023, 13 pages.
Notice of Allowance for U.S. Appl. No. 17/117,928, mailed May 3, 2023, 17 pages.

(56) References Cited

OTHER PUBLICATIONS

Office Action issued by the U.S. Patent and Trademark Office in the U.S. Appl. No. 17/988,359, mailed May 24, 2024, U.S. Patent and Trademark Office, Alexandria, VA. (34 pages).
Office Action issued by the U.S. Patent and Trademark Office in the U.S. Appl. No. 18/072,094, mailed May 29, 2024, U.S. Patent and Trademark Office, Alexandria, VA. (31 pages).
Office Action issued by the U.S. Patent and Trademark Office in the U.S. Appl. No. 18/229,905, mailed Jun. 21, 2024, U.S. Patent and Trademark Office, Alexandria, VA. (23 pages).

* cited by examiner

TRAINING SERVER AND METHOD FOR GENERATING A PREDICTIVE MODEL FOR CONTROLLING AN APPLIANCE

TECHNICAL FIELD

The present disclosure relates to the field of environment control systems. More specifically, the present disclosure relates to a training server and method for generating a predictive model for controlling an appliance.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental characteristic values, generally from external sensors, and in turn determines set points or command parameters to be sent to controlled appliances.

For instance, a room has current environmental characteristic value(s), such as a current temperature and a current humidity level, detected by sensors and reported to an environment controller. A user interacts with the environment controller to provide set point(s), such as a target temperature and/or a target humidity level. The environment controller sends the set point(s) to a controlled appliance (e.g. a heating, ventilating, and/or air-conditioning (HVAC) appliance). The controlled appliance generates commands for actuating internal components (of the controlled appliance) to reach the set point(s). Alternatively, the environment controller directly determines command(s) based on the set point(s), and transmits the command(s) to the controlled appliance. The controlled appliance uses the command(s) received from the environment controller to actuate the internal components to reach the set point(s). Examples of internal components include a motor, an electrical circuit (e.g. for generating heat), a valve (e.g. for controlling an air flow), etc.

However, the generation of the command(s) for actuating internal components of the controlled appliance does not take into consideration the current environmental characteristic value(s) and the set point(s) in combination, to generate the most adequate command(s). Furthermore, the generation of the command(s) does not take into consideration characteristic(s) of the room where the current environmental characteristic value(s) are measured, to generate the most adequate command(s). For example, characteristic(s) of the room include a geometry of the room (e.g. volume, surface, height, etc.).

A set of rules taking into consideration the current environmental characteristic value(s), the set point(s) and the room characteristic(s) may be implemented by the environment controller, for generating the most adequate command(s). However, the criteria for evaluating the adequacy of the command(s) based on the current environmental characteristic value(s), the set point(s) and the room characteristic(s) are multiple, potentially complex, and generally inter-related. Thus, the aforementioned set of rules would either by too simple to generate an effective model for generating the most adequate command(s), or alternatively too complicated to be designed by a human being.

However, current advances in artificial intelligence, and more specifically in neural networks, can be taken advantage of. More specifically, a predictive model, taking into consideration the current environmental characteristic value(s), the set point(s) and the room characteristic(s) to generate the most adequate command(s) for controlling the appliance, can be generated and used by a neural network.

The predictive model is generated by a neural network training engine. The training consists in feeding the neural network training engine with a plurality of inputs and corresponding expected output(s). At the end of the training, the predictive model is used by a neural network inference engine, to infer adequate output(s) when presented with a given set of inputs. The training phase is a complex process, which needs to be adapted to the particular field in which the predictive model is used. In the context of the present disclosure, the training needs to be adapted to the particular field of environment control systems, and more particularly to the functionalities of an environment controller controlling an appliance based on inputs received from sensors and set points received from users.

Therefore, there is a need for a new a training server and method for generating a predictive model for controlling an appliance.

SUMMARY

According to a first aspect, the present disclosure relates to a method for generating a predictive model for controlling an appliance. The method comprises storing, in a memory of a training server, a predictive model allowing a neural network inference engine to infer one or more outputs based on inputs. The method further comprises storing in the memory a set of rules. The method comprises receiving, by a processing unit of the training server, at least one room characteristic. The method comprises receiving by the processing unit at least one current environmental characteristic value and at least one set point from an environment controller via a communication interface of the training server. The method comprises determining by the processing unit one or more commands for controlling an appliance based on the at least one current environmental characteristic value, the at least one set point and the at least one room characteristic. The method comprises transmitting by the processing unit the one or more commands for controlling the appliance to the environment controller via the communication interface. The method comprises receiving by the processing unit at least one updated environmental characteristic value from the environment controller via the communication interface. The method comprises determining by the processing unit a value of a reinforcement signal based on the at least one set point, the at least one updated environmental characteristic value and the set of rules. The value of the reinforcement signal is one of positive reinforcement or negative reinforcement. The method comprises executing by the processing unit a neural network training engine to update the predictive model. The update of the predictive model is based on inputs comprising the at least one current environmental characteristic value, the at least one set point, and the at least one room characteristic. The update of the predictive model is also based on one or more outputs consisting of the one or more commands, and the value of the reinforcement signal.

According to a second aspect, the present disclosure relates to a training server comprising a communication interface, memory and a processing unit. The memory stores a predictive model allowing a neural network inference engine to infer one or more outputs based on inputs. The memory also stores a set of rules. The processing unit receives from an environment controller via the communication interface at least one room characteristic. The processing unit receives from the environment controller via the communication interface at least one current environmental characteristic value and at least one set point. The processing unit determines one or more commands for controlling an appliance based on the at least one current environmental characteristic value, the at least one set point and the at least one room characteristic. The processing unit transmits to the environment controller via the communication interface the one or more commands for controlling the appliance. The processing unit receives from the environment controller via the communication interface at least one updated environmental characteristic value. The processing unit determines a value of a reinforcement signal based on the at least one set point, the at least one updated environmental characteristic value and the set of rules. The value of the reinforcement signal is one of positive reinforcement or negative reinforcement. The processing unit executes a neural network training engine to update the predictive model. The update of the predictive model is based on inputs comprising the at least one current environmental characteristic value, the at least one set point, and the at least one room characteristic. The update of the predictive model is also based on one or more outputs consisting of the one or more commands, and the value of the reinforcement signal.

According to a third aspect, the present disclosure relates to a non-transitory computer program product comprising instructions executable by a processing unit of a training server. The execution of the instructions by the processing unit provides for generating a predictive model for controlling an appliance. More specifically, the execution of the instructions provides for storing, in a memory of the training server, a predictive model allowing a neural network inference engine to infer one or more outputs based on inputs. The execution of the instructions also provides for storing in the memory a set of rules. The execution of the instructions provides for receiving by the processing unit at least one room characteristic. The execution of the instructions provides for receiving by the processing unit at least one current environmental characteristic value and at least one set point from an environment controller via a communication interface of the training server. The execution of the instructions provides for determining by the processing unit one or more commands for controlling an appliance based on the at least one current environmental characteristic value, the at least one set point and the at least one room characteristic. The execution of the instructions provides for transmitting by the processing unit the one or more commands for controlling the appliance to the environment controller via the communication interface. The execution of the instructions provides for receiving by the processing unit at least one updated environmental characteristic value from the environment controller via the communication interface. The execution of the instructions provides for determining by the processing unit a value of a reinforcement signal based on the at least one set point, the at least one updated environmental characteristic value and the set of rules. The value of the reinforcement signal is one of positive reinforcement or negative reinforcement. The execution of the instructions provides for executing by the processing unit a neural network training engine to update the predictive model. The update of the predictive model is based on inputs comprising the at least one current environmental characteristic value, the at least one set point, and the at least one room characteristic. The update of the predictive model is also based on one or more outputs consisting of the one or more commands, and the value of the reinforcement signal.

BRIEF DESCRIPTION OF THE DRAWINGS

Embodiments of the disclosure will be described by way of example only with reference to the accompanying drawings, in which.

DETAILED DESCRIPTION

Figure 1:
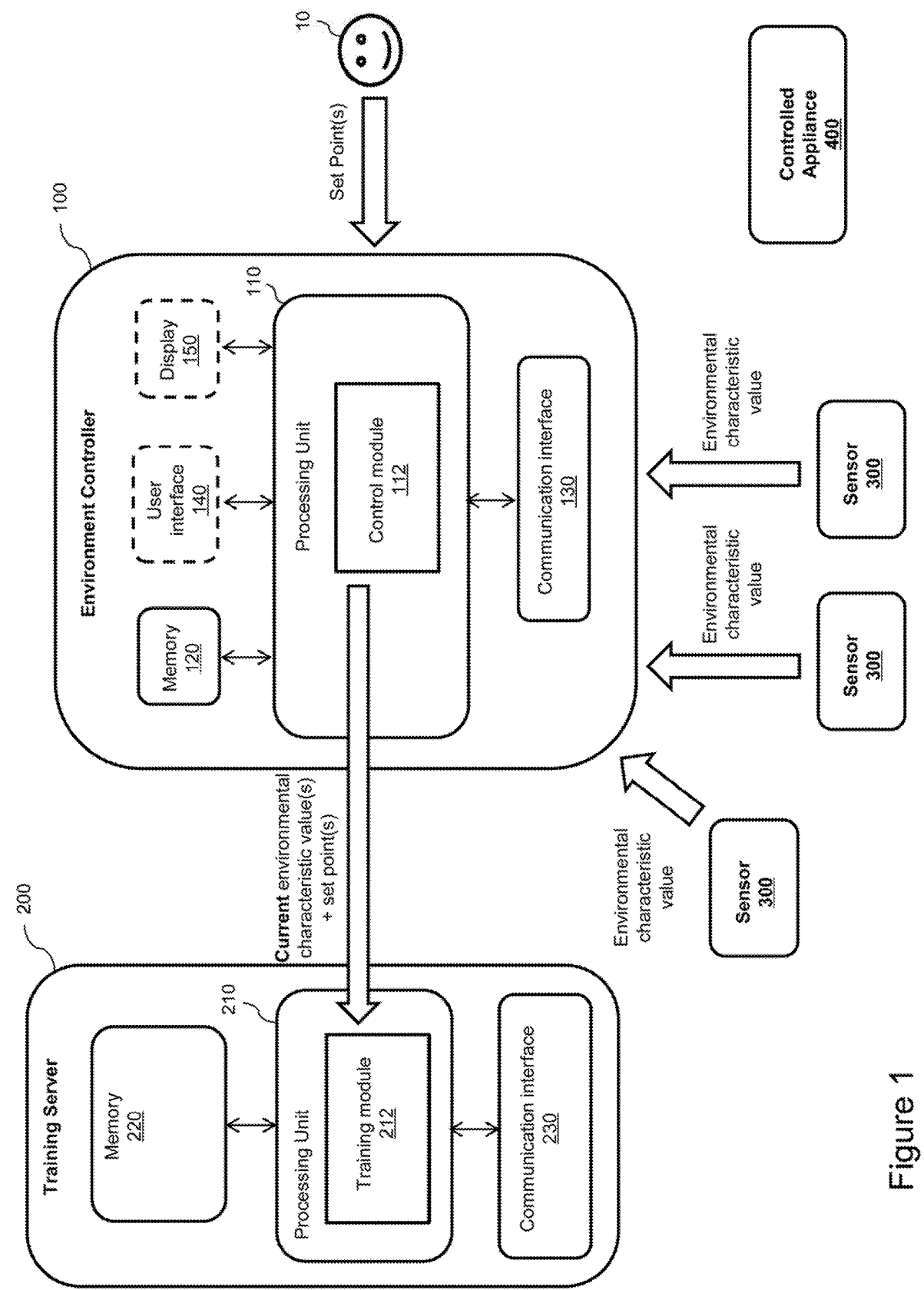
FIGS. 1-5 represent interactions between a training server and an environment controller to generate a predictive model for controlling an appliance under the supervision of the environment controller.

The foregoing and other features will become more apparent upon reading of the following non-restrictive description of illustrative embodiments thereof, given by way of example only with reference to the accompanying drawings.

Various aspects of the present disclosure generally address one or more of the problems related to the generation of a predictive model for controlling an appliance under the supervision of an environment controller. The predictive model is generated during a training phase, by a training server executing a neural network training engine. The predictive model is used during an operational phase, by the environment controller executing a neural network inference engine.

Terminology

The following terminology is used throughout the present disclosure:

Environment: condition(s) (temperature, humidity, pressure, oxygen level, carbon dioxide level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Referring now concurrently to FIGS. 1-5, 6A-D and 7A-B, an environment controller 100 (represented in FIGS. 1-5), a training server 200 represented in FIGS. 1-5), and a method 500 (represented in FIGS. 7A-B) for generating a predictive model for controlling an appliance under the supervision of the environment controller 100, are illustrated.

The environment controller 100 comprises a processing unit 110, memory 120, a communication interface 130, optionally a user interface 140, and optionally a display 150. The environment controller 100 may comprise additional components (not represented in FIG. 1 for simplification purposes).

The processing unit 110 comprises one or more processors (not represented in FIG. 1) capable of executing instructions of a computer program. Each processor may further comprise one or several cores.

The memory 120 stores instructions of computer program(s) executed by the processing unit 110, data generated by the execution of the computer program(s), data received via the communication interface 130, data received via the optional user interface 140, etc. Only a single memory 120 is represented in FIG. 1, but the environment controller 100 may comprise several types of memories, including volatile memory (such as a volatile Random Access Memory (RAM)) and non-volatile memory (such as a hard drive).

The communication interface 130 allows the environment controller 100 to exchange data with several devices (e.g. a training server 200, one or more sensors 300, one or more controlled appliances 400, etc.) over one or more communication network (not represented in FIG. 1 for simplification purposes). The term communication interface 130 shall be interpreted broadly, as supporting a single communication standard/technology, or a plurality of communication standards/technologies. Examples of communication interfaces 130 include a wireless (e.g. Wi-Fi, cellular, wireless mesh, etc.) communication module, a wired (e.g. Ethernet) communication module, a combination of wireless and wired communication modules, etc. In an exemplary configuration, the communication interface 130 of the environment controller 100 has a first wireless (e.g. Wi-Fi) communication module for exchanging data with the sensor(s) 300 and the controlled appliance(s) 400, and a second wired (e.g. Ethernet) communication module for exchanging data with the training server 200. The communication interface 130 usually comprises a combination of hardware and software executed by the hardware, for implementing the communication functionalities of the communication interface 130.

At least some of the steps of the method 500 are implemented by the environment controller 100, to generate the predictive model allowing control of the appliance 400.

A dedicated computer program has instructions for implementing at least some of the steps of the method 500. The instructions are comprised in a non-transitory computer program product (e.g. the memory 120) of the environment controller 100. The instructions, when executed by the processing unit 110 of the environment controller 100, provide for generating the predictive model allowing control of the appliance 400. The instructions are deliverable to the environment controller 100 via an electronically-readable media such as a storage media (e.g. CD-ROM, USB key, etc.), or via communication links (e.g. via a communication network through the communication interface 130).

The dedicated computer program executed by the processing unit 110 comprises a control module 112.

The training server 200 comprises a processing unit 210, memory 220, a communication interface 230, optionally a user interface and/or a display (not represented in FIG. 1 for simplification purposes). The training server 200 may comprise additional components (not represented in FIG. 1 for simplification purposes).

The processing unit 210 comprises one or more processors (not represented in FIG. 1) capable of executing instructions of a computer program. Each processor may further comprise one or several cores.

The memory 220 stores instructions of computer program(s) executed by the processing unit 210, data generated by the execution of the computer program(s), data received via the communication interface 230, etc. Only a single memory 220 is represented in FIG. 1, but the training server 200 may comprise several types of memories, including volatile memory (such as a volatile Random Access Memory (RAM)) and non-volatile memory (such as a hard drive).

The communication interface 230 allows the training server 200 to exchange data with other devices (e.g. the environment controller 100, etc.) over one or more communication network (not represented in FIG. 1 for simplification purposes). As mentioned for the communication interface 130, the term communication interface 230 shall be interpreted broadly, as supporting a single communication standard/technology, or a plurality of communication standards/technologies. Examples of communication interfaces 230 include a wireless (e.g. Wi-Fi, cellular, wireless mesh, etc.) communication module, a wired (e.g. Ethernet) communication module, a combination of wireless and wired communication modules, etc. The communication interface 230 usually comprises a combination of hardware and software executed by the hardware, for implementing the communication functionalities of the communication interface 230.

At least some of the steps of the method 500 are implemented by the training server 200, to generate the predictive model allowing control of the appliance 400.

A dedicated computer program has instructions for implementing at least some of the steps of the method 500. The instructions are comprised in a non-transitory computer program product (e.g. the memory 220) of the training server 200. The instructions, when executed by the processing unit 210 of the training server 200, provide for generating the predictive model allowing control of the appliance 400. The instructions are deliverable to the training server 200 via an electronically-readable media such as a storage media (e.g. CD-ROM, USB key, etc.), or via communication links (e.g. via a communication network through the communication interface 230).

The dedicated computer program executed by the processing unit 210 comprises a training module 212. The execution of the training module 212 generates the predictive model, through interactions with the environment controller 100 during a training phase. When the training phase is completed, the predictive model is transmitted to the environment controller 100. The environment controller 100 uses the predictive model to infer command(s) for controlling the appliance 400, based on current operating conditions of the environment controller 100.

Also represented in FIG. 1 are the sensors 300. Although not represented in FIG. 1 for simplification purposes, the sensors 300 comprise at least one sensing module for detecting an environmental characteristic, and a communication interface for transmitting to the environment controller 100 an environmental characteristic value corresponding to the detected environmental characteristic. The environmental characteristic value is transmitted over a communication network and received via the communication interface 130 of the environment controller 100. The sensors 300 may also comprise a processing unit for generating the environmental characteristic value based on the detected environmental characteristic.

Figure 2:
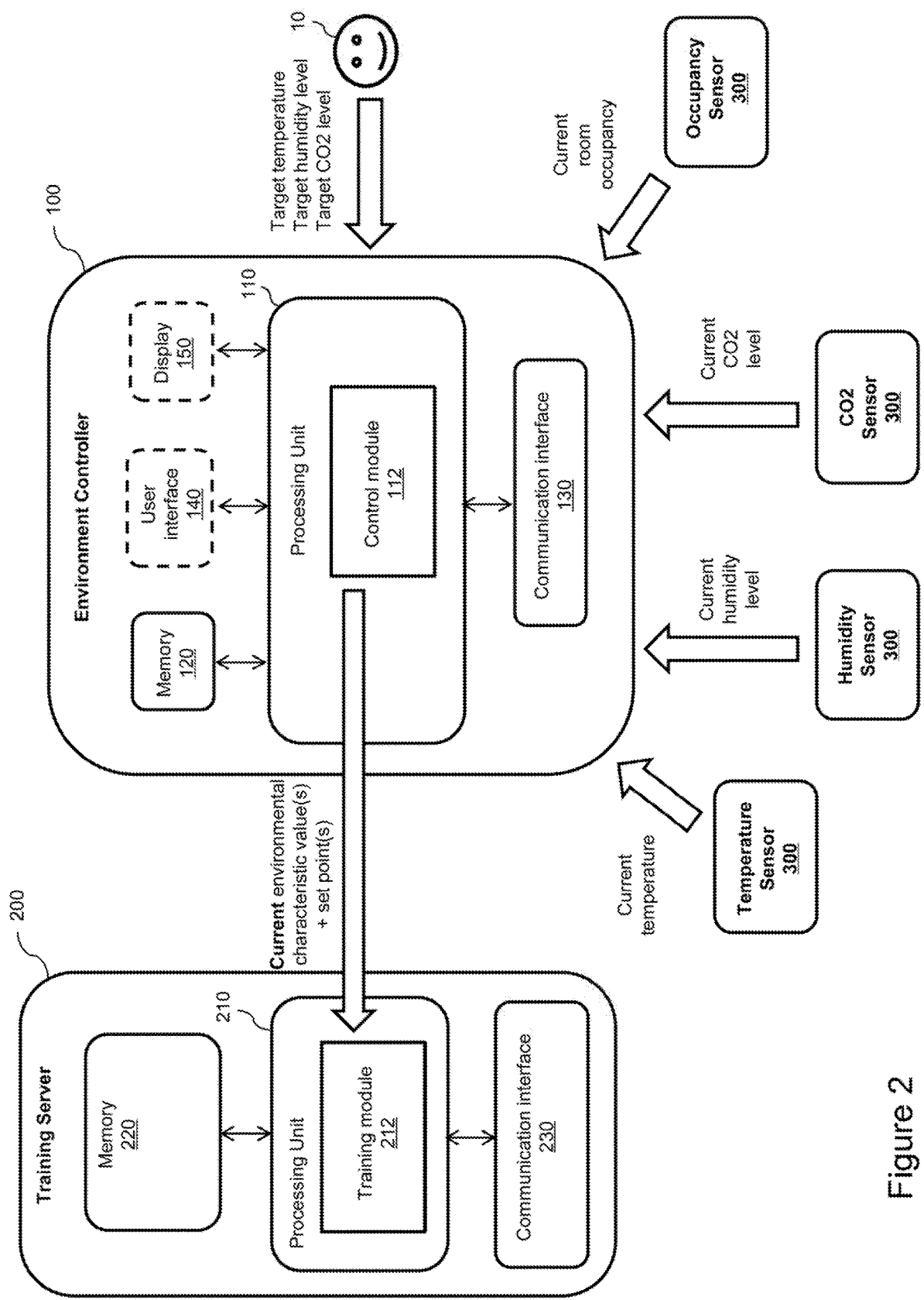

FIG. 2 illustrates examples of sensors 300 and corresponding examples of transmitted environmental characteristic value(s). The examples include a temperature sensor 300, capable of measuring a current temperature and transmitting the measured current temperature to the environment controller 100. The examples also include a humidity sensor 300, capable of measuring a current humidity level and transmitting the measured current humidity level to the environment controller 100. The examples further include a carbon dioxide ($CO_2$) sensor 300, capable of measuring a current $CO_2$ level and transmitting the measured current $CO_2$ level to the environment controller 100. The examples also include a room occupancy sensor 300, capable of determining a current occupancy of a room and transmitting the determined current room occupancy to the environment controller 100.

The room comprises the sensors 300 and the controlled appliance 400. The environment controller 100 may or may not be present in the room (the environment controller 100 may remotely control the environment of the room, which includes controlling the controlled appliance 400 based on the inputs of the sensors 300).

The aforementioned examples of sensors 300 are for illustration purposes only, and a person skilled in the art would readily understand that other types of sensors 300 could be used in the context of an environment control system managed by the environment controller 100. Furthermore, each environmental characteristic value may consist of either a single value (e.g. current temperature of 25 degrees Celsius), or a range of values (e.g. current temperature within 25 to 26 degrees Celsius).

The temperature, humidity and $CO_2$ sensors are well known in the art, and easy to implement types of sensors. With respect to the occupancy sensor, its implementation may be more or less complex, based on its capabilities. For example, a basic occupancy sensor (e.g. based on ultrasonic or infrared technology) is only capable of determining if a room is occupied or not. A more sophisticated occupancy sensor is capable of determining the number of persons present in a room; and may use a combination of camera(s) and pattern recognition software for this purpose. Consequently, in the context of the present disclosure, a sensor 300 shall be interpreted as potentially including several devices cooperating for determining an environmental characteristic value (e.g. one or more cameras collaborating with a pattern recognition software executed by a processing unit for determining the current number of persons present in the room).

Also represented in FIG. 1 is the controlled appliance 400. Although not represented in FIG. 1 for simplification purposes, the controlled appliance 400 comprises at least one actuation module, and a communication interface for receiving one or more commands from the environment controller 100. The actuation module can be of one of the following types: mechanical, pneumatic, hydraulic, electrical, electronical, a combination thereof, etc. The one or more commands control operations of the at least one actuation module. The one or more commands are transmitted over a communication network via the communication interface 130 of the environment controller 100. The controlled appliance 400 may also comprise a processing unit for controlling the operations of the at least one actuation module based on the received one or more commands.

For example, the controlled appliance 400 consists of a VAV appliance. Examples of commands transmitted to the VAV appliance 400 include commands directed to one of the following: an actuation module controlling the speed of a fan, an actuation module controlling the pressure generated by a compressor, an actuation module controlling a valve defining the rate of an airflow, etc. This example is for illustration purposes only, and a person skilled in the art would readily understand that other types of controlled appliances 400 could be used in the context of an environment control system managed by the environment controller 100.

Also represented in FIG. 1 is a user 10. The user 10 provides at least one set point to the environment controller 100. Examples of set points include target environmental characteristic values, such as a target temperature, a target humidity level, a target $CO_2$ level, a combination thereof, etc. The at least one set point is related to the room where the sensors 300 and the controlled appliance 400 are located. Alternatively, the controlled appliance 400 is not located in the room, but the operations of the controlled appliance 400 under the supervision of the environment controller 100 aim at reaching the at least one set point in the room. The user 10 enters the at least one set point via the user interface 140 of the environment controller 100. Alternatively, the user 10 enters the at least one set point via a user interface of a computing device (e.g. a smartphone, a tablet, etc.) not represented in FIG. 1 for simplification purposes; and the at least one set point is transmitted over a communication network and received via the communication interface 130 of the environment controller 100.

FIG. 2 illustrates examples of set points, comprising a target temperature, a target humidity level and a target $CO_2$ level. These examples are for illustration purposes only, and a person skilled in the art would readily understand that other types of set points could be used in the context of an environment control system managed by the environment controller 100. Furthermore, each set point may consist of either a single value (e.g. target temperature of 25 degrees Celsius), or a range of values (e.g. target temperature within 25 to 26 degrees Celsius).

The processing unit 110 of the environment controller 100 also determines at least one room characteristic. For example, the control module 112 executed by the processing unit 110 is in charge of determining the room characteristic(s).

As mentioned previously, the room comprises the sensors 300 and the controlled appliance 400. Alternatively, the controlled appliance 400 is not located in the room, but the operations of the controlled appliance 400 affect the environmental conditions of the room where the sensors 300 are located. Furthermore, only some of the sensors 300 may be located in the room, while other sensors 300 may be located outside of the room (e.g. an outdoor temperature and/or humidity sensor).

The room characteristic(s) include one or more geometric characteristics of the room. Examples of geometric characteristics include a volume of the room, a surface of the room, a height of the room, a length of the room, a width of the room, etc. Instead of a given value, the geometric characteristics may be identified as ranges of values. For example, the volume of the room is defined by the following ranges of values: 0 to 50 cubic meters, 50 to 200 cubic meters, and higher than 200 cubic meters. Similarly, the height of the room is defined by the following ranges of values: lower than 3 meters and higher than 3 meters.

Alternatively or complementarity, the room characteristic(s) include a human activity in the room. For example, the human activity in the room comprises periods of time when the room is occupied by humans; for instance, during the day or during the night, in the morning or in the afternoon, during the week or the week end, etc. Alternatively or complementarity, the human activity in the room defines the type of activity performed by the persons occupying the room; for instance, the room is an office room, a room in a store, a storage room, a workshop room, a room in a house or an apartment, etc.

Alternatively, the room characteristic(s) include a room type identifier of the current room. The room type identifier of the current room is selected among a plurality of pre-defined room type identifiers, depending on the characteristics of the current room. For example, the room type identifiers consist of alphanumerical values. Thus, instead of using room characteristics such as a given room geometry and a given human activity in the room, a corresponding unique room type identifier is used. This unique room type identifier is used at steps 505, 510, 515, optionally 540, and 575 of the method 500.

For example, a room having a volume from 0 to 50 cubic meters AND a height lower than 3 meters has the identifier 10, a room having a volume from 0 to 50 cubic meters AND a height higher than 3 meters has the identifier 11, a room having a volume from 50 to 200 cubic meters AND a height lower than 3 meters has the identifier 20, a room having a volume from 50 to 200 cubic meters AND a height higher than 3 meters has the identifier 21, a room having a volume higher than 200 cubic meters AND a height lower than 3 meters has the identifier 30, and a room having a volume higher than 200 cubic meters AND a height higher than 3 meters has the identifier 31. Furthermore, the human activity in the room can also be encoded in the unique room type identifiers. For example, the extension A is used for an office room, the extension B is used for a store, the extension C is used for a storage room, and the extension D is used for an apartment. Thus, the following set of unique room type identifiers is available: 10A, 10B, 10C, 10D, 11A, 11B, 11C, 11D, 20A, 20B, 20C, 20D, 21A, 21B, 21C, 21D, etc.

A person skilled in the art would readily understand that other types of room characteristics could be used in the context of an environment control system managed by the environment controller 100.

Figure 3:
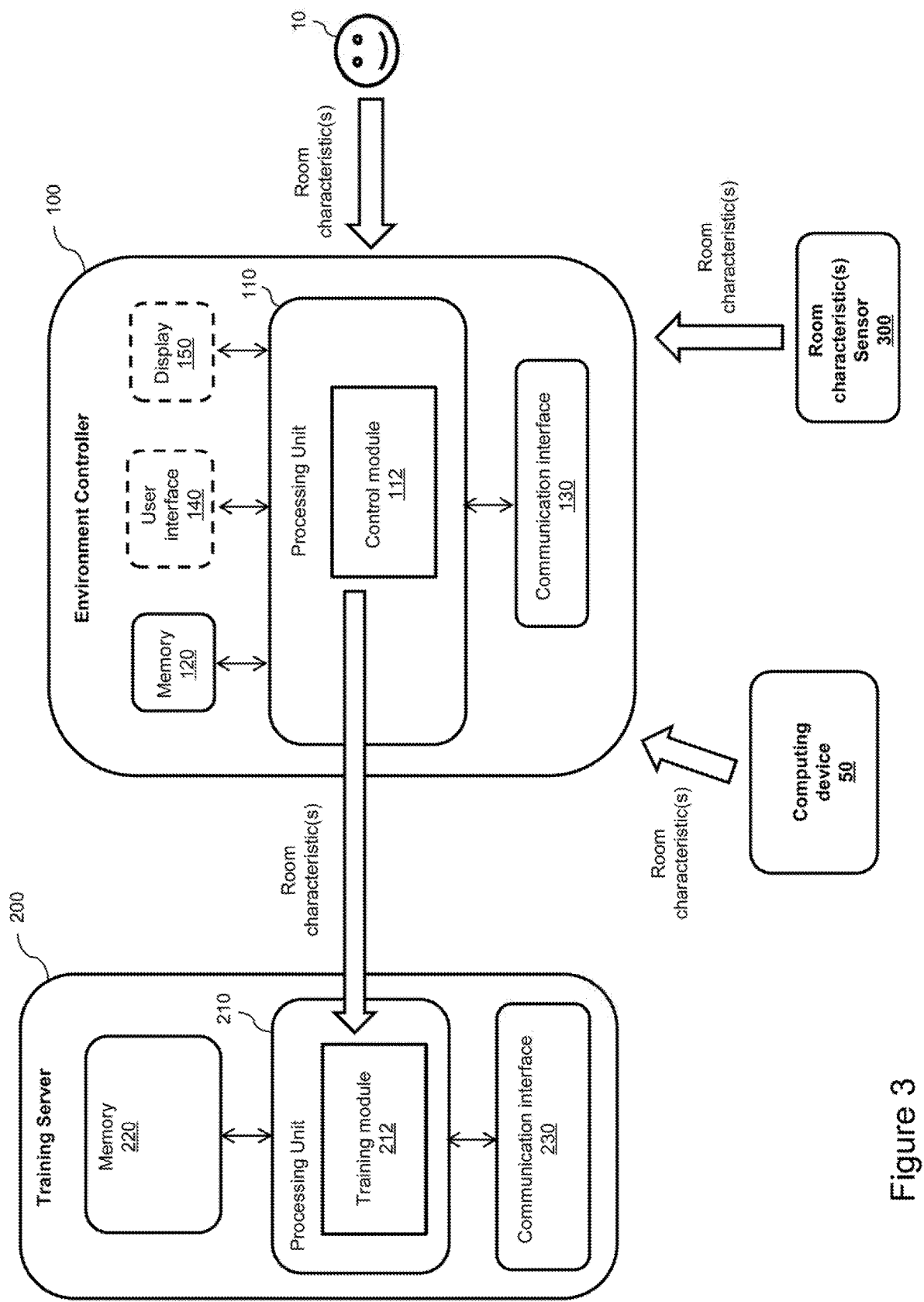

FIG. 3 illustrates examples of the determination of the room characteristic(s) by the processing unit 110 of the environment controller 100.

The determination of the room characteristic(s) comprises receiving the room characteristic(s) from a computing device 50 via the communication interface 130, and storing the room characteristic(s) in the memory 120 of the environment controller 100.

Alternatively or complementarily, the determination of the room characteristic(s) comprises receiving the room characteristic(s) from the user 10 via the user interface 140 of the environment controller 100, and storing the room characteristic(s) in the memory 120.

Alternatively or complementarily, the determination of the room characteristic(s) comprises receiving the room characteristic(s) from a sensor 300 via the communication interface 130, and storing the room characteristic(s) in the memory 120 of the environment controller 100. The sensor 300 is capable of automatically determining room characteristic(s). For example, the sensor 300 combines one or more cameras, and a processing unit, capable of automatically determining geometric characteristics of the room. In another example, the sensor 300 combines one or more cameras (or sound sensor, motion detector, etc.), and a processing unit, capable of automatically determining a human activity in the room. Alternatively, the sensor 300 only transmits collected data (e.g. images of the room) to the processing unit 110 of the environment controller 100, and the processing unit 110 determines the room characteristic(s) based on the data transmitted by the sensor 300.

The room characteristic(s) usually do not change over time. Thus, the determination occurs only once, and the room characteristics are permanently stored in the memory 120 for being transmitted to the training server 200, as will be illustrated later in the description.

Figure 7A:
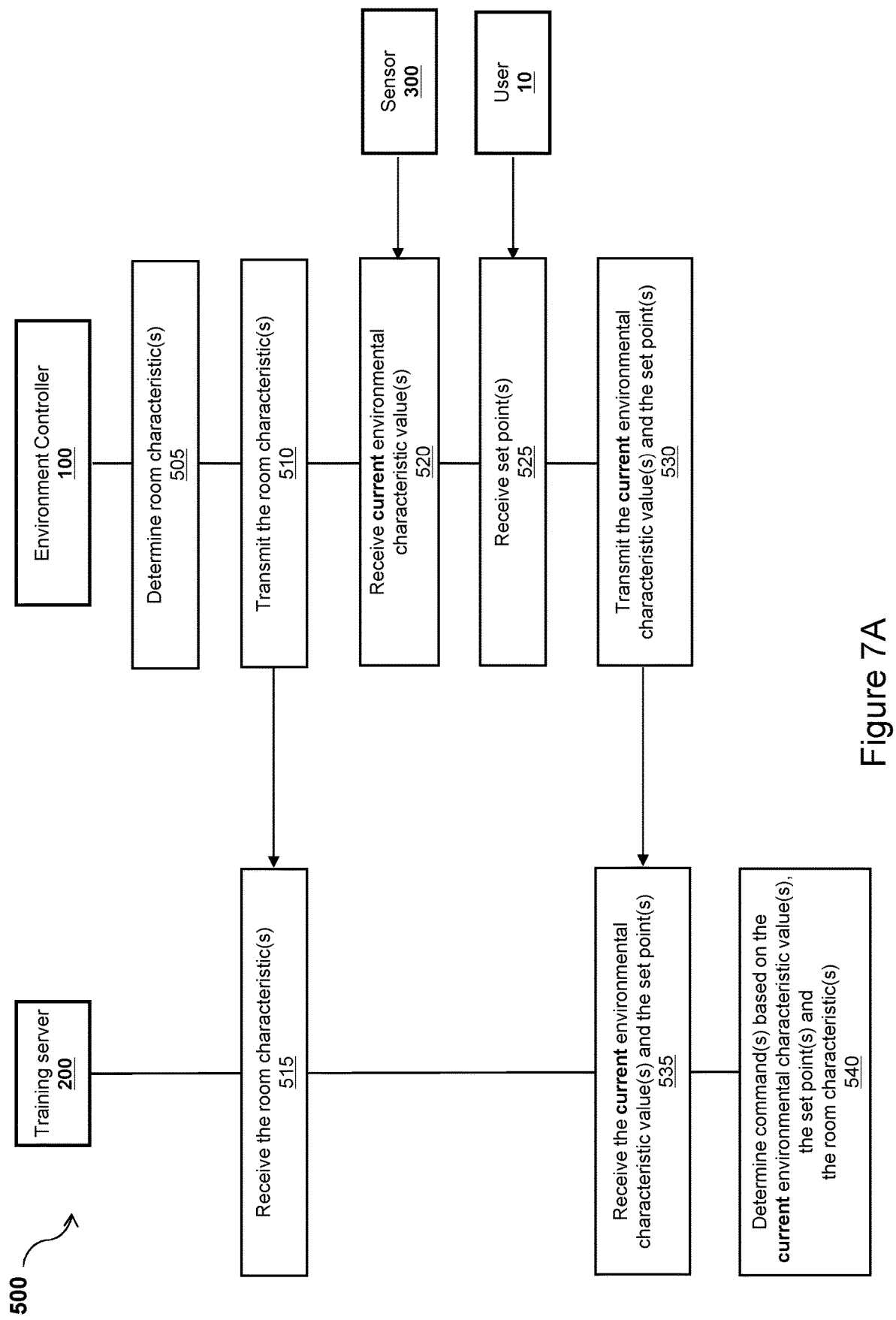
FIGS. 7A-B represent a method implemented by the training server and the environment controller of FIGS. 1-5 for generating the predictive model.
Figure 7B:
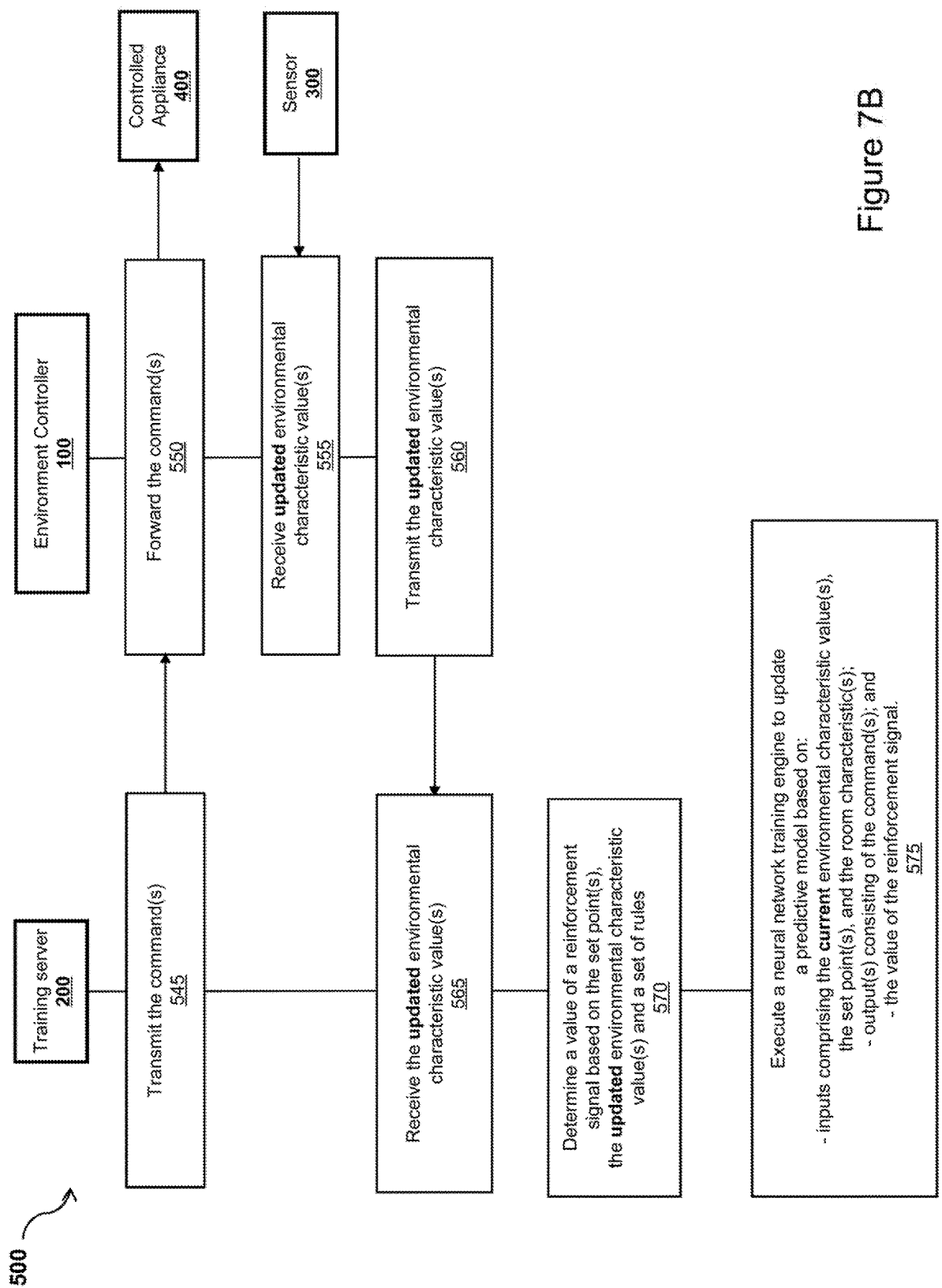

Reference is now made more particularly to FIGS. 7A and 7B, which represent the steps of the method 500. Steps 505, 510, 520, 525, 530, 550, 555 and 560 are performed by the environment controller 100. Steps 515, 535, 540, 545, 565, 570 and 575 are performed by the training server 200.

The method 500 comprises the step 505 of determining at least one room characteristic. Step 505 is performed by the control module 112 executed by the processing unit 110 of the environment controller 100. This step has been described previously, and is illustrated in FIG. 3.

The method 500 comprises the step 510 of transmitting the at least one room characteristic to the training server 200 via the communication interface 130. Step 510 is performed by the control module 112 executed by the processing unit 110 of the environment controller 100. This step is illustrated in FIG. 3.

The method 500 comprises the step 515 of receiving the at least one room characteristic from the environment controller 100 via the communication interface 230. Step 515 is performed by the training module 212 executed by the processing unit 210 of the training server 200. This step is illustrated in FIG. 3.

The method 500 comprises the step 520 of receiving at least one environmental characteristic value from the at least one sensor 300. The at least one environmental characteristic value is received by the processing unit 110 via the communication interface 130. Step 520 is performed by the control module 112 executed by the processing unit 110 of the environment controller 100. This step has been described previously, and is illustrated in FIGS. 1 and 2. The environmental characteristic value(s) received at step 520 is (are) referred to as the current environmental characteristic value(s).

The method 500 comprises the step 525 of receiving at least one set point from the user 10. The at least one set point is received by the processing unit 110 via the user interface 140 and/or the communication interface 130. Step 525 is performed by the control module 112 executed by the processing unit 110 of the environment controller 100. This step has been described previously, and is illustrated in FIGS. 1 and 2.

The method 500 comprises the step 530 of transmitting the at least one current environmental characteristic value and the at least one set point to the training server 200 via the communication interface 130. Step 530 is performed by the control module 112 executed by the processing unit 110 of the environment controller 100. This step is illustrated in FIGS. 1 and 2.

The method 500 comprises the step 535 of receiving the at least one current environmental characteristic value and the at least one set point from the environment controller 100 via the communication interface 230. Step 535 is performed by the training module 212 executed by the processing unit 210 of the training server 200. This step is illustrated in FIGS. 1 and 2.

The method 500 comprises the step 540 of determining one or more commands for controlling the appliance 400. The determination is based on the at least one current environmental characteristic value (received at step 535), the at least one set point (received at step 535), and the at least one room characteristic (received at step 515). Step 540 is performed by the training module 212 executed by the processing unit 210 of the training server 200. More specifically, the training module 212 comprises a functionality referred to as a command generator for performing step 540.

Figure 6A:
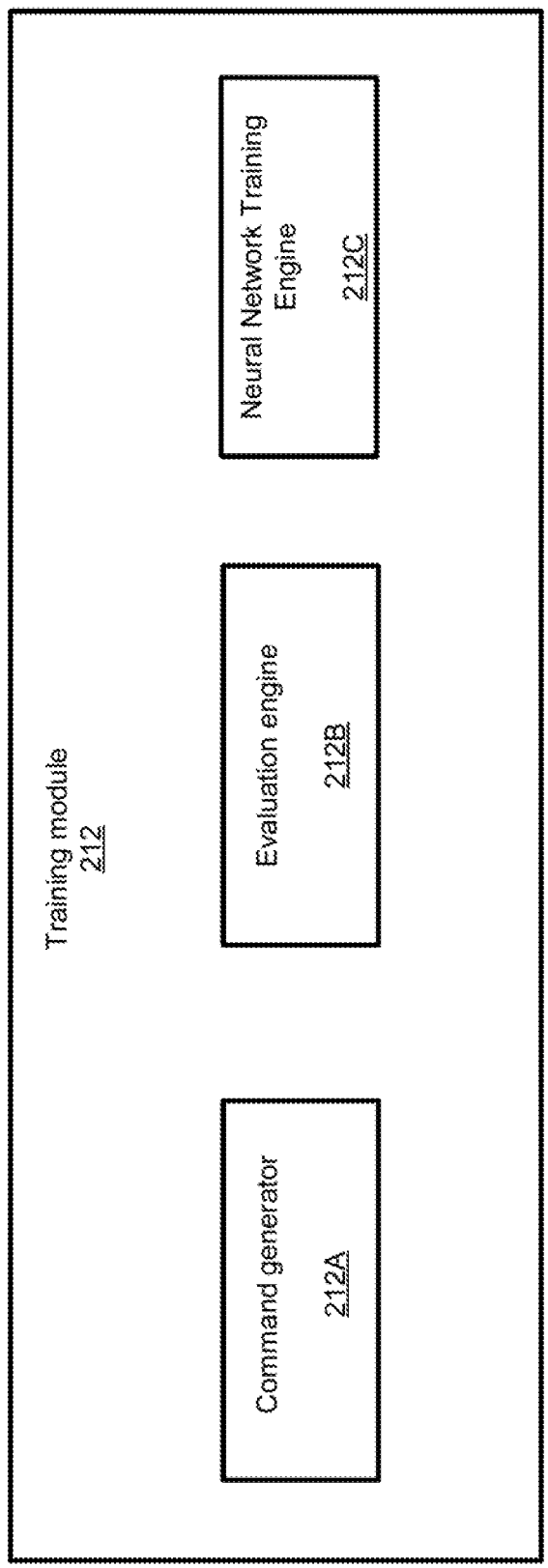
FIGS. 6A-D represent functionalities of a training module executed by the training server of FIGS. 1-5.
Figure 6B:
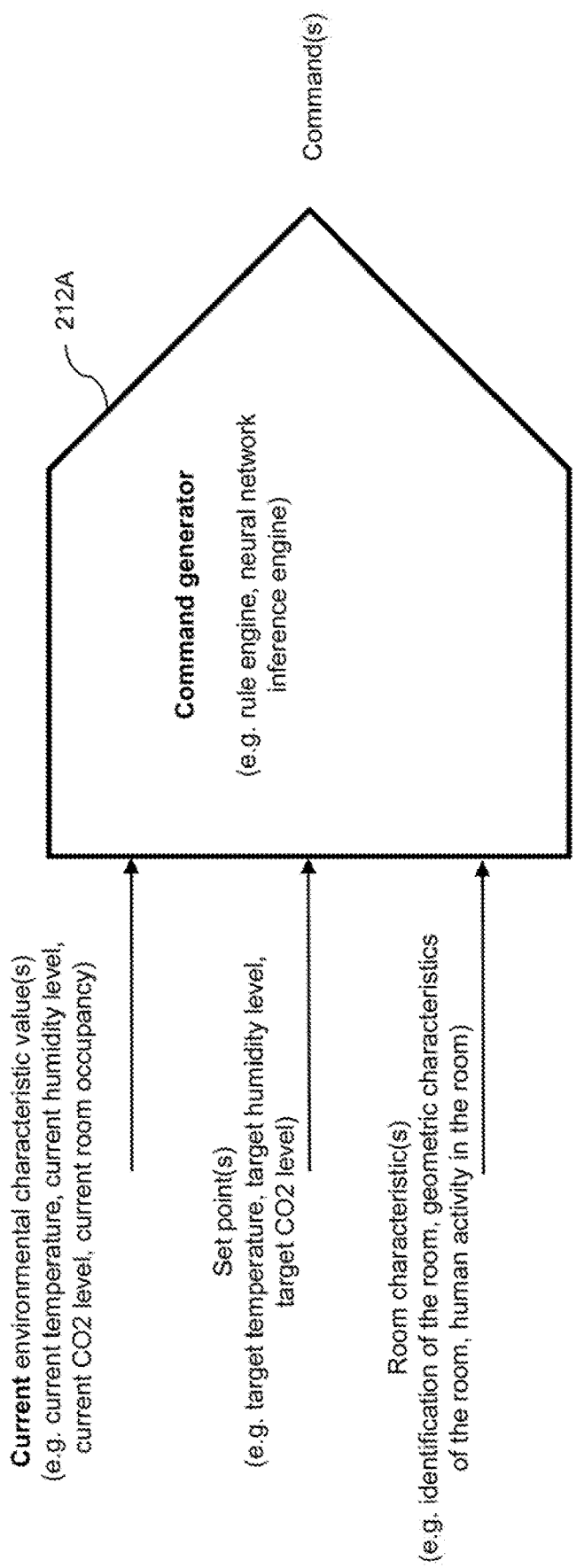

FIG. 6A illustrates the training module 212 including the command generator functionality 212A. FIG. 6B illustrates the determination of the command(s) by the command generator 212A, based on the aforementioned inputs.

For example, the command generator 212A determines a single command for controlling the speed of a fan, alternatively a single command for controlling the pressure generated by a compressor, and alternatively a combination of the command for controlling the speed of the fan and the command for controlling the pressure generated by the compressor.

The command generator 212A is implemented by a rule engine determining the command(s) based on the inputs, according to a set of rules applied by the rule engine. For example, based on the difference between a current temperature and a target temperature, a command consisting of a fan speed is determined. If the difference is lower than 2 degrees Celsius, the fan speed is set to 10 revolutions per second. If the difference is between 2 and 5 degrees Celsius, the fan speed is set to 20 revolutions per second. If the difference is higher than 5 degrees Celsius, the fan speed is set to 30 revolutions per second. Furthermore, the volume of the room is taken into consideration as follows: if the volume of the room is lower than 100 cubic meters, the previously determined fan speed is divided by a factor of two; and if the volume of the room is higher than 200 cubic meters, the previously determined fan speed is multiplied by a factor of two. The same type of adjustment of the fan speed can be applied with respect to the height of the room, in combination with, or alternatively to, the volume of the room. A user interface of the training server 200 can be used to allow a user to validate/correct the command(s) determined by the rule engine, to determine the command(s) manually when no rules among the set of rules applies to a current set of input parameters. The user interface of the training server 200 can also be used for adapting/improving the rules, for example if the current set of rules is not adapted to specific characteristics of the room.

Alternatively, the command generator 212A is implemented by a neural network inference engine, which uses the current state of the predictive model to determine the command(s) based on the inputs. This option can be used when the predictive model has already reached a proper level of accuracy, and only needs to be further refined. For instance, during a first phase, the command generator 212A uses a set of rules and inputs from a user to determine the command(s). In a second phase, the predictive model is used by the neural network inference engine to generate the command(s), for the purpose of refining the predictive model.

These exemplary techniques for implementing the command generator 212A are for illustration purposes only. A person skilled in the art would be capable of designing other mechanisms for determining the command(s) based on the current environmental characteristic value(s) (received at step 535), the set point(s) (received at step 535), and the room characteristic(s) (received at step 515).

Figure 4:
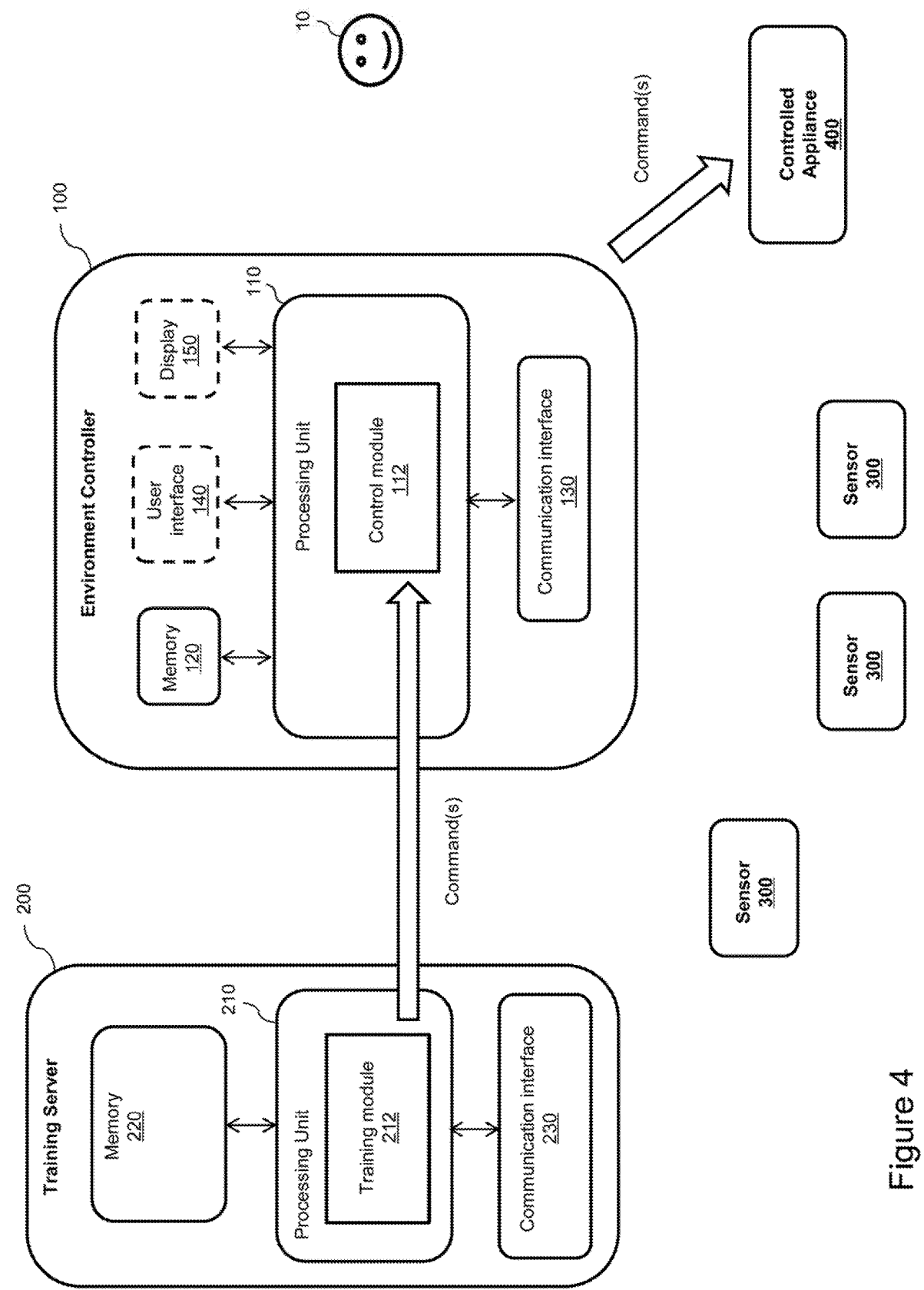

The method 500 comprises the step 545 of transmitting the one or more commands to the environment controller 100 via the communication interface 230. Step 545 is performed by the training module 212 executed by the processing unit 210 of the training server 200. This step is illustrated in FIG. 4.

The method 500 comprises the step 550 of forwarding the one or more commands to the controlled appliance 400. Step 550 is performed by the control module 112 executed by the processing unit 110 of the environment controller 100. Step 550 includes receiving the one or more commands from the training server 200 via the communication interface 230, and transmitting the one or more commands to the controlled appliance 400 via the communication interface 230. This step is illustrated in FIG. 4.

Although not represented in FIG. 7B for simplification purposes, upon reception of the one more commands, the controlled appliance 400 executes the received one or more commands.

Figure 5:
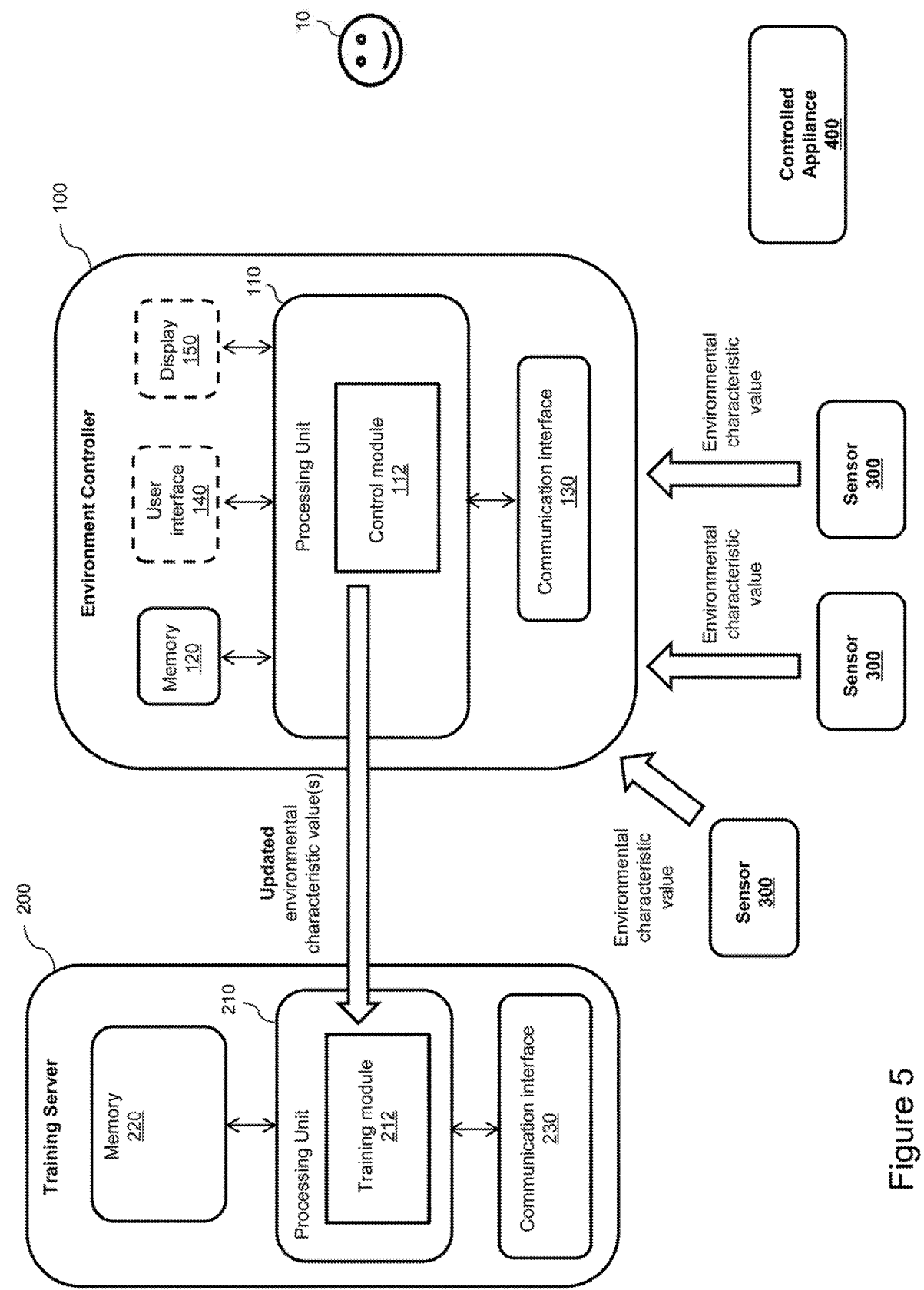

The method 500 comprises the step 555 of receiving at least one environmental characteristic value from the at least one sensor 300. The at least one environmental characteristic value is received by the processing unit 110 via the communication interface 130. Step 555 is performed by the control module 112 executed by the processing unit 110 of the environment controller 100. This step is illustrated in FIG. 5. The environmental characteristic value(s) received at step 555 is (are) referred to as the updated environmental characteristic value(s). Each updated environmental characteristic value is representative of the evolution of the environmental conditions in the room, following the execution of the one or more commands by the controlled appliance 400.

The control module 112 determines when a measure of the updated environmental characteristic value(s) shall be made. The timing of the measure may depend on the type of command(s) forwarded to the controlled appliance 400 at step 550. For example, for a first command, the time required to produce the expected modification(s) to the environmental conditions of the room is 2 minutes; while for another command, it is 5 minutes. If a sensor 300 operates in a push mode (transmitting data at regular intervals), some of the transmitted data may be ignored by the control module 112, to respect the timing of the measure. If a sensor 300 operates in a pull mode, the control module 112 requests the sensor 300 to transmit the data according to the timing of the measure.

The method 500 comprises the step 560 of transmitting the at least one updated environmental characteristic value to the training server 200 via the communication interface 130. Step 560 is performed by the control module 112 executed by the processing unit 110 of the environment controller 100. This step is illustrated in FIG. 5.

The method 500 comprises the step 565 of receiving the at least one updated environmental characteristic value from the environment controller 100 via the communication interface 230. Step 565 is performed by the training module 212 executed by the processing unit 210 of the training server 200. This step is illustrated in FIG. 5.

The updated environmental characteristic value(s) of steps 555/560/565 is (are) related to the set point(s) of steps 525/530/535. For example, if the set point is a target temperature, then the updated environmental characteristic value is an updated temperature. If the set point is a target humidity level, then the updated environmental characteristic value is an updated humidity level. If the set points include a target temperature and a target CO2 level, then the updated environmental characteristic values include an updated temperature and an updated CO2 level. Each updated environment characteristic value is representative of the efficiency of the command(s) for reaching the corresponding set point.

The method 500 comprises the step 570 of determining a value of a reinforcement signal, the value of the reinforcement signal being one of positive reinforcement or negative reinforcement. The determination is based on the at least one set point (received at step 535), the at least one updated environmental characteristic value (received at step 565), and a set of rules (stored in the memory 220 of the training server 200). Step 570 is performed by the training module 212 executed by the processing unit 210 of the training server 200. More specifically, the training module 212 comprises a functionality referred to as an evaluation engine for performing step 570.

Figure 6C:
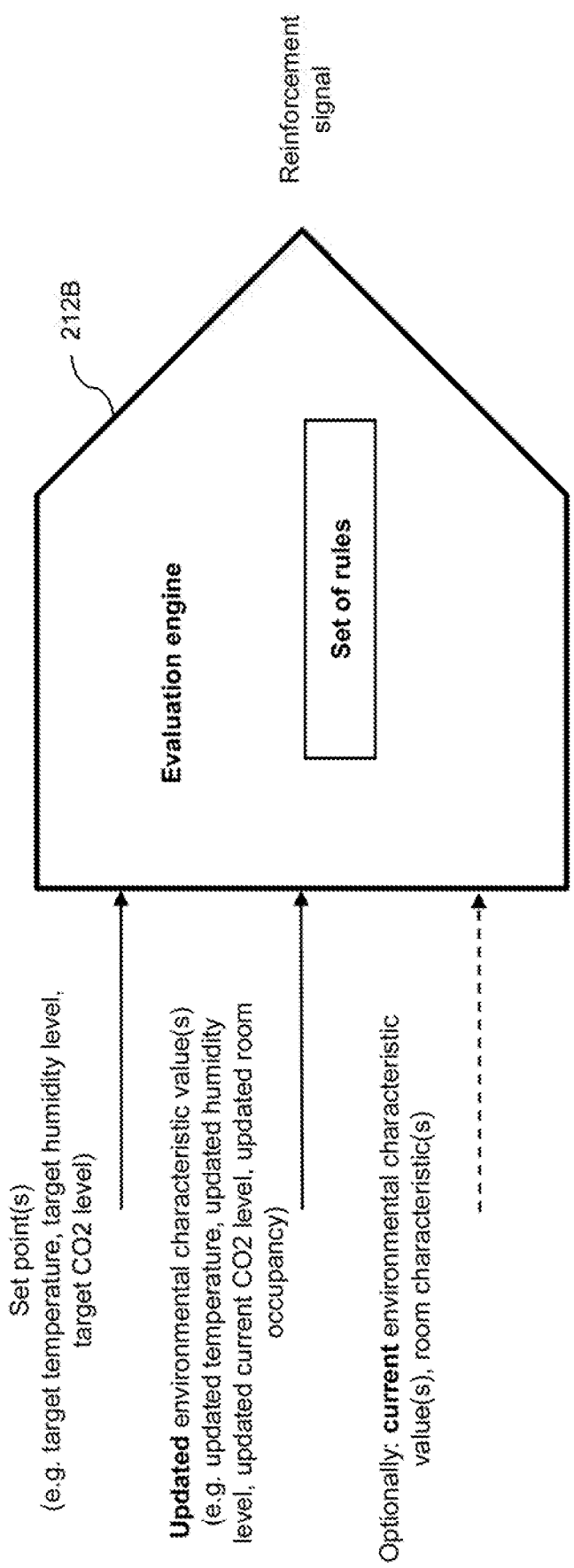

FIG. 6A illustrates the training module 212 including the evaluation engine functionality 212B. FIG. 6C illustrates the determination of the reinforcement signal by the evaluation engine 212B, based on the inputs, according to a set of rules applied by the evaluation engine. The inputs include the set point(s) (received at step 535) and the updated environmental characteristic value(s) (received at step 565). The inputs may also include the current environmental characteristic value(s) (received at step 535) and/or the room characteristic(s) (received at step 515).

The set of rules used by the evaluation engine 212B is designed for evaluating the efficiency of the command(s) determined at step 540 for reaching the set point(s) received at step 525. If the command(s) is evaluated as being efficient, the outcome is a positive reinforcement value for the reinforcement signal. If the command(s) is evaluated as not being efficient, the outcome is a negative reinforcement value for the reinforcement signal. The reinforcement signal usually takes only two Boolean values: positive reinforcement or negative reinforcement. Alternatively, the reinforcement signal may be expressed as a percentage representing a relative efficiency. For example, positive reinforcement includes the values between 51 and 100%, while negative reinforcement includes the values between 0 and 49%.

Following are exemplary sets of rules for evaluating the efficiency of the command(s) based on a target temperature and an updated temperature. According to a first exemplary set of rules, the reinforcement signal is positive if the absolute difference between the target temperature and the updated temperature is lower than a threshold (e.g. 0.5 degree Celsius).

A second exemplary set of rules uses timestamped measures of the updated temperature. The reinforcement signal is positive if the absolute difference between the target temperature and the updated temperature measured 5 minutes after transmitting the commands (step 545) is lower than a first threshold (e.g. 2 degrees Celsius) AND the absolute difference between the target temperature and the updated temperature measured 10 minutes after transmitting the commands (step 545) is lower than a second threshold (e.g. 0.5 degree Celsius).

A third exemplary set of rules further uses the volume of the room. The reinforcement signal is positive if the absolute difference between the target temperature and the updated temperature is lower than a first threshold (e.g. 0.5 degree Celsius) AND the volume of the room is lower than 150 cubic meters. The reinforcement signal is also positive if the absolute difference between the target temperature and the updated temperature is lower than a second threshold (e.g. 1 degree Celsius) AND the volume of the room is higher than 150 cubic meters.

A fourth exemplary set of rules further uses the human activity in the room, and more specifically the type of activity performed by humans occupying the room. The reinforcement signal is positive if the absolute difference between the target temperature and the updated temperature is lower than a first threshold (e.g. 1 degree Celsius) AND the room is an office room. The reinforcement signal is also positive if the absolute difference between the target temperature and the updated temperature is lower than a second threshold (e.g. 2 degrees Celsius) AND the room is a storage room.

A fifth exemplary set of rules also uses the human activity in the room, and more specifically periods of time when the room is occupied by humans. The reinforcement signal is positive if the absolute difference between the target temperature and the updated temperature is lower than a first threshold (e.g. 1 degree Celsius) AND the current time is within a period of occupation of the room (e.g. between 8 am and 6 pm from Monday to Saturday). The reinforcement signal is also positive if the absolute difference between the target temperature and the updated temperature is lower than a second threshold (e.g. 2 degrees Celsius) AND the current time is within a period of inoccupation of the room (e.g. anytime except between 8 am and 6 pm from Monday to Saturday).

In all the previous examples, conditions have been defined for the reinforcement signal to be positive. By default, any other condition results in the reinforcement signal being negative.

The previous exemplary sets of rules are for illustration purposes only. A person skilled in the art would be capable of implementing other sets of rules taking into consideration the set point(s) (received at step 535), the updated environmental characteristic value(s) (received at step 565), and optionally the current environmental characteristic value(s) (received at step 535) and/or the room characteristic(s) (received at step 515).

The method 500 comprises the step 575 of executing a neural network training engine to update the predictive model. At the end of the training period, the predictive model is used by a neural network inference engine to infer output(s) based on inputs. The update of the predictive model by the neural network training engine is based on the following: inputs of the predictive model, one more corresponding outputs of the predictive model, and the value of the reinforcement signal (determined at step 570). The inputs of the predictive model comprise the at least one current environmental characteristic value (received at step 535), the at least one set point (received at step 535), and the at least one room characteristic (received at step 515). A person skilled in the art would readily understand that additional inputs representative of the operating conditions of the environment controller 100 can be used for generation of the predictive model. The one or more corresponding outputs consist of the one or more commands (determined at step 540). Step 575 is performed by the training module 212 executed by the processing unit 210 of the training server 200. More specifically, the training module 212 comprises a functionality consisting of a neural network training engine for performing step 575.

Figure 6D:
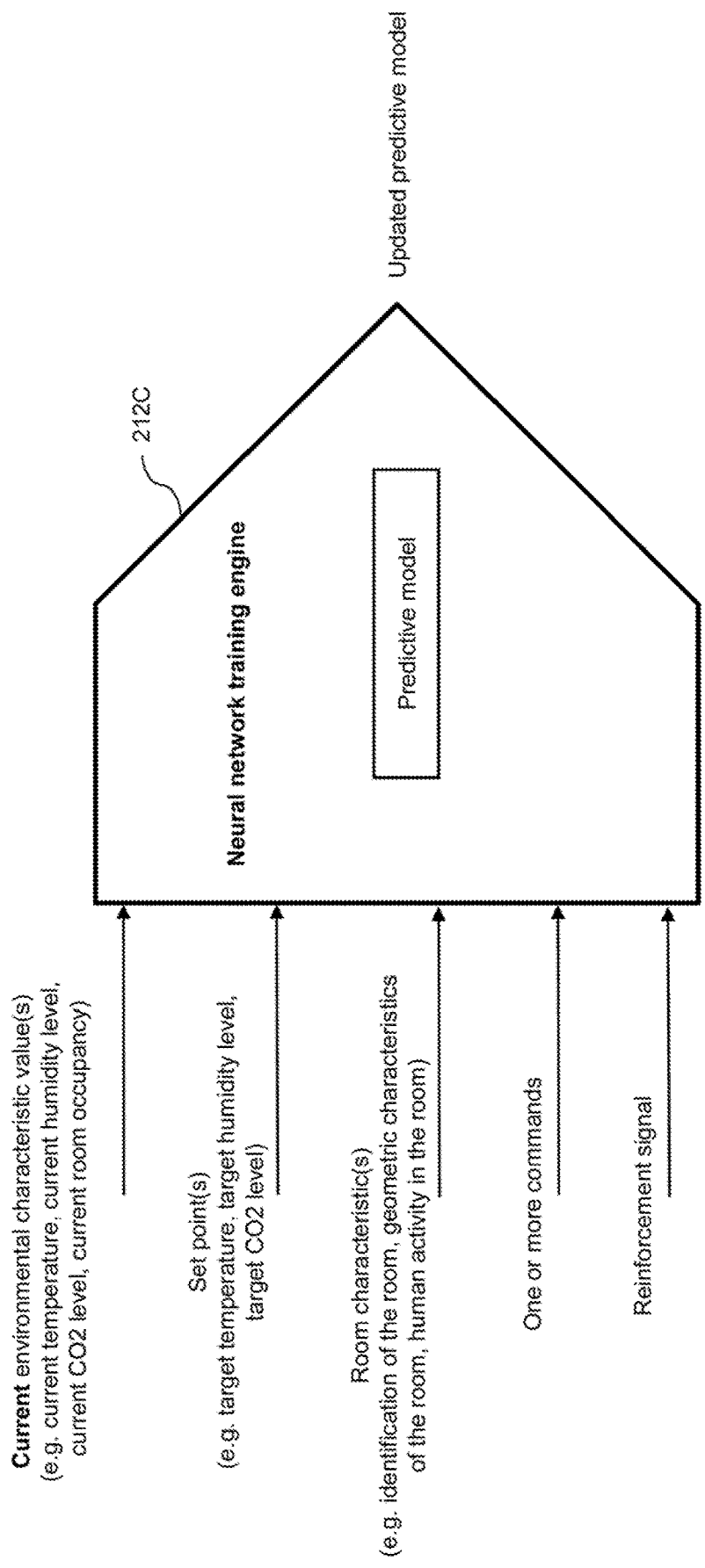

FIG. 6A illustrates the training module 212 including the neural network training engine functionality 212C. FIG. 6D illustrates the generation of an update of the predictive model by the neural network training engine 212C, based on the inputs, the corresponding output(s) and the reinforcement signal.

Reinforcement training is a technique well known in the art of artificial intelligence. Having a set of inputs and the corresponding output(s), the weights of the predictive model are updated to favor the corresponding output(s) when presented with the inputs, if the value of the reinforcement signal is a positive reinforcement. Complementarily, having a set of inputs and the corresponding output(s), the weights of the predictive model are updated to unfavor the corresponding output(s) when presented with the inputs, if the value of the reinforcement signal is a negative reinforcement. Thus, having a given set of inputs and a candidate set of corresponding output(s), the neural network training engine 212C learns through reinforcement training which one(s) among the candidate set of corresponding output(s) is (are) the best fit for the given set of input(s). In the context of the present disclosure, the neural network training engine 212C learns (through reinforcement training) which command(s) is/are the best fit for reaching the set point(s), when presented with the current environmental characteristic value(s), the set point(s) and the room characteristic(s).

Additionally, during the training phase, the number of layers of the neural network and the number of nodes per layer can be adjusted to improve the accuracy of the predictive model. At the end of the training phase, the predictive model generated by the neural network training engine 212C includes the number of layers, the number of nodes per layer, and the weights.

The description of the method 500 has been illustrated with a single current environmental characteristic value (e.g. current temperature), a single set point (e.g. target temperature), and a single room characteristic (e.g. volume of the room). However, more than one set point and/or more than one current environmental characteristic value and/or more than one room characteristic may be used. For example, in addition to the target temperature, a target humidity level is included in the set points. Accordingly, the current environmental characteristic values include a current temperature, and a current humidity level.

The command generator 212A generates command(s) for performing the transition from the current temperature and humidity level to the target temperature and humidity level. The evaluation engine 212B takes into consideration at least the target temperature and target 0 humidity level, and the updated temperature and updated humidity level, for evaluating the efficiency of the command(s) generated by the command generator 212A. The inputs of the neural network training engine 212C include the current temperature and current humidity level, and the target temperature and target humidity level.

Still other current environmental characteristic value(s) may be taken into consideration (e.g. room occupancy and/or $CO_2$ level) for performing the transition from the current temperature/humidity level to the target temperature/humidity level. In this case, only two set points are used: the target temperature and the target humidity level. Only two updated environmental characteristic value(s) are used: the updated temperature and the updated humidity level. And the following current environmental characteristic value(s) are used: the current temperature, the current humidity level, and at least of the current room occupancy and current $CO_2$ level.

Furthermore, several room characteristics may be considered in combination, such as the room height and the room volume.

The steps of the method 500 are repeated multiple times, in order to improve the accuracy of the predictive model generated at step 575. However, the room characteristic(s) may remain constant during the training period; or at least change less often than the current environmental characteristic value(s) and the set point(s). Therefore, steps 505-510-515 (determination and transmission of the room characteristics) are optional. Steps 505-510-515 are performed only at a first occurrence of the method 500; and optionally at later occurrences of the method 500 if the room characteristic(s) have changed. Upon reception at step 515, the room characteristic(s) is (are) stored in the memory 220 of the training server 200. By contrast, steps 520-525-530-535 (transmission of the current environmental characteristic values and the set points) are performed at each occurrence of the method 500.

Additionally, at least some of the room characteristics received by the training server 200 at step 515 may not be determined and transmitted by the environment controller 100 at steps 505 and 510. For instance, some of the room characteristics are received from a user via a user interface of the training server 200. Alternatively, some of the room characteristics are received via the communication interface 230 of the training server 200 from a computing device (not represented in the Figures) different from the environment controller 100. For example, this can be the case for the geometric characteristics of the room, if no sensor 300 capable of automatically determining the geometric characteristics of the room is deployed in the room. This can also be the case for the human activity in the room, if this human activity does not change over time.

Steps 555-560-565 may be repeated several times during a single occurrence of the method 500, if step 570 uses different values of a given updated environment characteristic value measured at different time points. For example, as mentioned previously, timestamped measures of the updated temperature are determined by performing steps 555-560-565 5 minutes after transmitting the commands at step 545, and by repeating steps 555-560-565 10 minutes after transmitting the commands at step 545. The optional repetition of steps 555-560-565 is not illustrated in FIG. 7B for simplification purposes.

A variant of the method 500 consists in not using the room characteristics. In this case, the predictive model is simpler and is easier to generate. For instance, the neural network corresponding to the predictive model may comprise less layers of neurons and/or less neurons per layers. The steps of the method 500 are impacted as follows.

In this variant of the method 500, steps 505, 510 and 515 are not executed. At step 540, the determination of the commands only takes into consideration the current environmental characteristic value(s) and the set point(s). At step 570, the option of using the room characteristic(s) for determining the value of the reinforcement signal is not used. This option is not represented in FIG. 7B for simplification purposes; but was described previously. At step 575, the execution of the neural network training engine for updating the predictive model does not take into consideration the room characteristics.

For example, in the case where the predictive model is generated for a single room with room characteristics (e.g. geometry of the room and human activity in the room) which do not vary over time, there is no need to take into consideration the room characteristics for generating the predictive model. Similarly, in the case where the predictive model is generated for a plurality of rooms with similar room characteristics (e.g. geometry of the room and human activity in the room) which do not vary over time, there is also no need to take into consideration the room characteristics for generating the predictive model.

Although not represented in FIGS. 1 to 7B for simplification purposes, the training server 200 may exchange data with a plurality of environment controllers 100, as will be illustrated later in the description in relation to FIG. 8. A proprietary communication protocol may be used for exchanging data between the training server 200 and the environment controller(s) 100; at steps 510/515, 530/535, 545/550 and 560/565 of the method 500. Alternatively, the training server 200 executes a web server and the one or more environment controller 100 executes a web client. The exchange of data between the training server 200 and the environment controller(s) 100 is based on the Hypertext Transfer Protocol (HTTP) or Hypertext Transfer Protocol Secure (HTTPS) protocol, as is well known in the art.

When the training phase has been completed and the predictive model has reached a satisfying level of accuracy, the predictive model can be used by a neural network inference engine in an operational phase. During the operational phase, the neural network inference engine (not represented in the Figures for simplification purposes) is executed by the processing unit 110 of the environment controller 100. The neural network inference engine uses the predictive model determined during the training phase, to infer an output (one or more commands for controlling the appliance 400) based on inputs (at least one environmental characteristic value received from the sensor(s) 300, at least one set point received from the user 10, and at least one room characteristic determined by the processing unit 110).

In order to determine if the predictive model has reached a satisfying level of accuracy, a testing set of inputs and a corresponding testing set of output(s) is used. The neural network inference engine is presented with the testing set of inputs, and a set of output(s) inferred with the predictive model is compared to the testing set of output(s). A level of concordance between the inferred set of output(s) and the testing set of output(s) is defined, for deciding whether the predictive model has reached the satisfying level of accuracy. The testing set of inputs and the corresponding testing set of output(s) can be generated during the training phase. The evaluation engine 212B executed at step 570 of the method 500 can be used to identify the outputs (the commands sent to the controlled appliance 400) having a proper efficiency, which are then included in the testing set of output(s).

Figure 8:
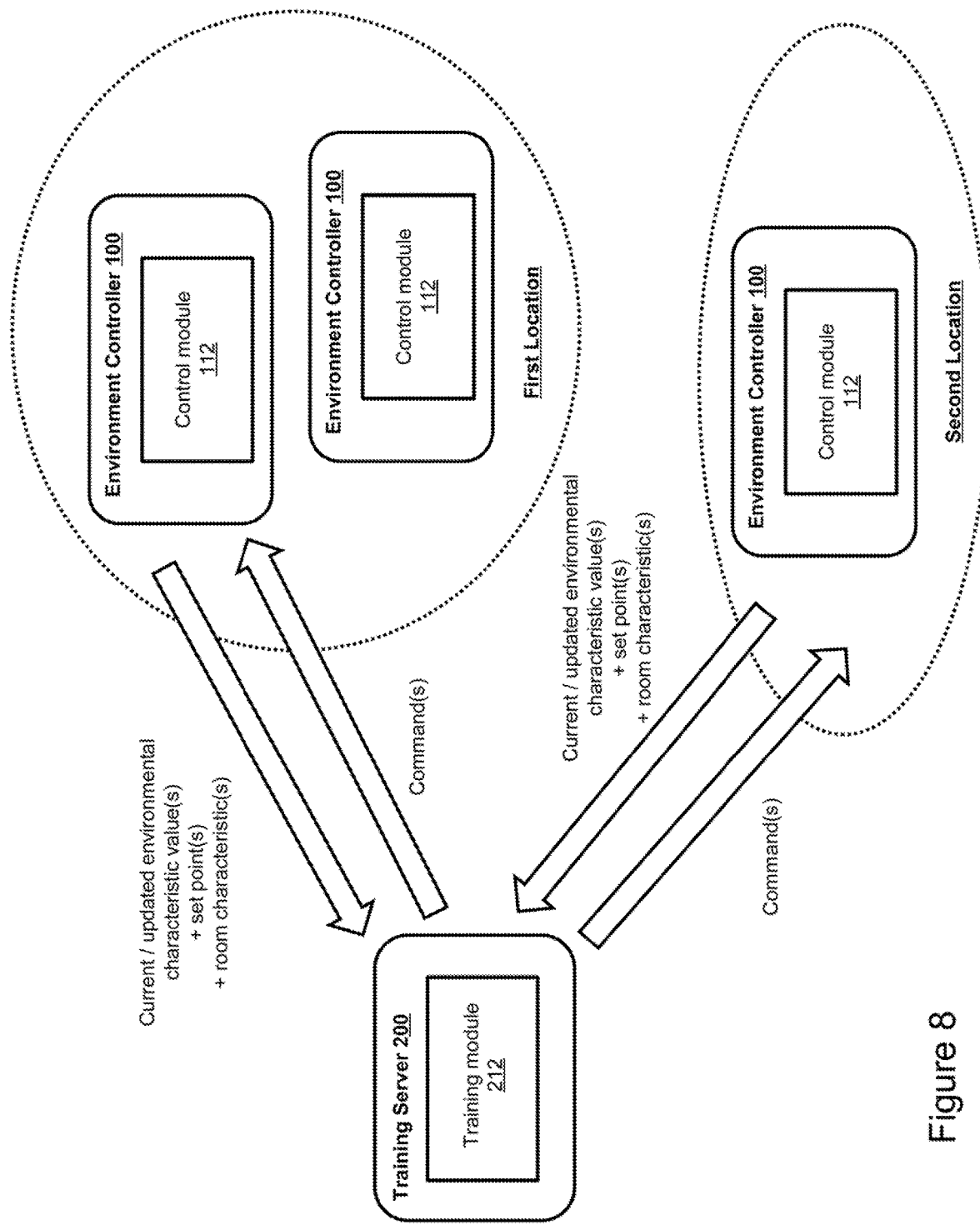
FIG. 8 represents an environment control system where the training server and environment controllers implementing the method illustrated in FIGS. 7A-B are deployed.

Reference is now made concurrently to FIGS. 1-5, 7A-B and 8, where FIG. 8 illustrates the usage of the method 500 in a large environment control system.

A first plurality of environment controllers 100 implementing the method 500 are deployed at a first location. Only two environment controllers 100 are represented for illustration purposes, but any number of environment controllers 100 may be deployed.

A second plurality of environment controllers 100 implementing the method 500 are deployed at a second location. Only one environment controller 100 is represented for illustration purposes, but any number of environment controllers 100 may be deployed.

The first and second locations may consist of different buildings, different floors of the same building, etc. Only two locations are represented for illustration purposes, but any number of locations may be considered.

Each environment controller 100 represented in FIG. 8 interacts with at least one sensor 300, at least one user 10, and at least one controlled appliance 400, as illustrated in FIG. 1. Furthermore, each environment controller 100 represented in FIG. 8 determines at least one room characteristic(s) as illustrated in FIG. 3.

The environment controllers 100 correspond to the environment controller represented in FIG. 1, which execute the control module 112. The environment controllers 100 exchange data with the training server 200 according to the method 500. The training server 200 corresponds to the training server represented in FIG. 1.

In a first implementation, a dedicated predictive model is generated by the training server 200 for each one of the environment controllers 100 according to the method 500.

In a second implementation, a shared predictive model is generated by the training server 200 for a plurality of environment controllers 100 according to the method 500. For example, a first predictive model is generated for all the environment controllers 100 at the first location; and a second predictive model is generated for all the environment controllers 100 at the second location.

Furthermore, the predictive model generally depends on the type of controlled appliance 400 under the supervision of the environment controllers 100. For example, a first predictive model is generated for the environment controllers 100 (located at the first or second location) controlling a first type of appliance 400; and a second predictive model is generated for the environment controllers 100 (located at the first or second location) controlling a second type of appliance 400.

When a predictive model is generated for a plurality of environment controllers 100, each one of the plurality of environment controllers 100 exchange data with the training server 200 according to the method 500. Thus, the generation of the predictive model by the training server 200 benefits from training data provided by each one of the plurality of environment controllers 100.

The data exchanged between the training server 200 and the environment controllers 100 have been detailed previously in the description. The exchanged data include current and updated environmental characteristic value(s), set point(s), room characteristic(s) and command(s).

The training server 200 may be implemented as a cloud-based server in communication with the environment controllers 100 via a networking infrastructure, as is well known in the art.

Figure 9:
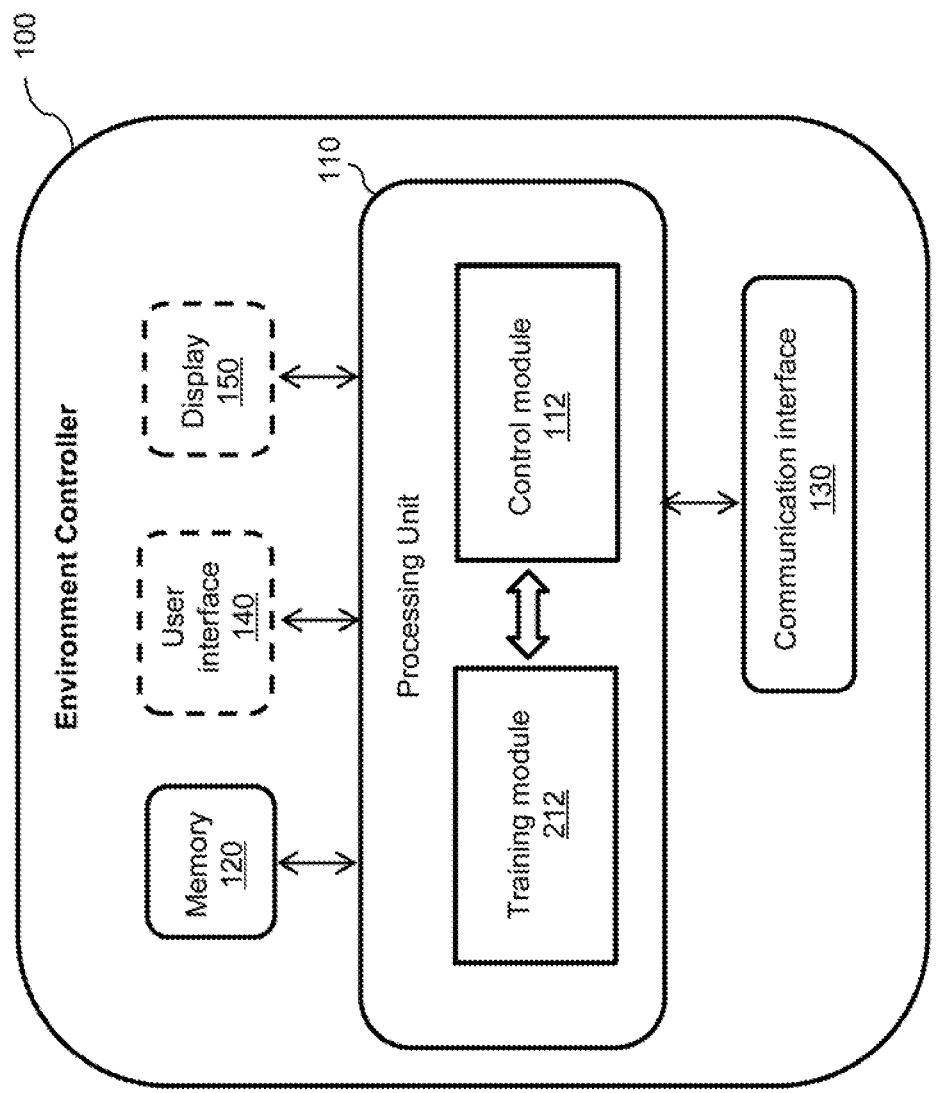
FIG. 9 represents an environment controller including the training module represented in FIGS. 6A-D.

Reference is now made concurrently to FIGS. 1, 6A and 9, where FIG. 9 illustrates an alternative implementation of the environment controller 100.

In FIG. 9, the processing unit 110 of the environment controller 100 also executes the training module 212. Thus, in this implementation, there is no need for a standalone training server 200. All the operations for generating the predictive model are performed on the environment controller 100. Since the training module 212 requires an important amount of processing power (and possibly an important amount of memory), this implantation is only possible if the environment controller 100 provides adequate computing capabilities.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for generating a predictive model of a neural network used for controlling an appliance, the method comprising:
   storing in a memory of a training server a predictive model of a neural network;
   storing in the memory a set of rules;
   receiving by a processing unit of the training server at least one room characteristic, the at least one room characteristic comprising a type of activity performed by humans occupying the room;
   receiving by the processing unit at least one current environmental characteristic value and at least one set point from an environment controller via a communication interface of the training server;
   determining by the processing unit one or more commands for controlling an appliance based on the at least one current environmental characteristic value, the at least one set point and the at least one room characteristic;
   transmitting by the processing unit the one or more commands for controlling the appliance to the environment controller via the communication interface;
   receiving by the processing unit at least one updated environmental characteristic value from the environment controller via the communication interface;
   determining by the processing unit a value of a reinforcement signal by applying the set of rules to inputs comprising the at least one current environmental characteristic value received from the environment controller before generation and transmission to the environment controller of the one or more commands, the at least one set point, the at least one updated environmental characteristic value received from the environment controller after transmission to the environment controller of the one or more commands and the at least one room characteristic, the application of the set of rules generating the value of the reinforcement signal, the value of the reinforcement signal being one of positive reinforcement or negative reinforcement; and
   executing by the processing unit a neural network training engine implementing reinforcement training to update the predictive model of the neural network based on:
      inputs comprising the at least one current environmental characteristic value, the at least one set point, and the at least one room characteristic;
      one or more outputs consisting of the one or more commands; and
      the value of the reinforcement signal.

2. The method of claim 1, wherein the predictive model of the neural network comprises weights of the neural network, and updating the predictive model comprises updating the weights.

3. The method of claim 1, wherein the at least one room characteristic is received from the environment controller via the communication interface of the training server.

4. The method of claim 1, wherein the at least one room characteristic further comprises at least one of the following: a room type identifier selected among a plurality of room type identifiers, one or more geometric characteristics of the room, and periods of time when the room is occupied by humans.

5. The method of claim 1, wherein the at least one current environmental characteristic value comprises at least one of the following: a current temperature, a current humidity level, a current carbon dioxide ($CO_2$) level, and a current room occupancy.

6. The method of claim 1, wherein the at least one updated environmental characteristic value comprises at least one of the following: an updated temperature, an updated humidity level, and an updated carbon dioxide ($CO_2$) level.

7. The method of claim 1, wherein the at least one set point comprises at least one of the following: a target temperature, a target humidity level, and a target $CO_2$ level.

8. The method of claim 1, wherein the one or more commands for controlling the appliance include at least one of the following: a command for controlling a speed of a fan, a command for controlling a pressure generated by a compressor, and a command for controlling a rate of an airflow through a valve.

9. The method of claim 1, wherein the set of rules generates the positive reinforcement or the negative reinforcement in response to an absolute difference between the at least one set point and the at least one updated environmental characteristic value with respect to a threshold.

10. A training server, comprising:
   a communication interface;
   memory for storing:
      a predictive model of a neural network; and
      a set of rules; and
   a processing unit for:
      receiving from an environment controller via the communication interface at least one room characteristic, the at least one room characteristic comprising a type of activity performed by humans occupying the room;
      receiving from the environment controller via the communication interface at least one current environmental characteristic value and at least one set point;
      determining one or more commands for controlling an appliance based on the at least one current environmental characteristic value, the at least one set point and the at least one room characteristic;
      transmitting to the environment controller via the communication interface the one or more commands for controlling the appliance;
      receiving from the environment controller via the communication interface at least one updated environmental characteristic value;
      determining a value of a reinforcement signal by applying the set of rules to inputs comprising the at least one current environmental characteristic value received from the environment controller before generation and transmission to the environment controller of the one or more commands, the at least one set point, the at least one updated environmental characteristic value received from the environment controller after transmission to the environment controller of the one or more commands and the at least one room characteristic, the application of the set of rules generating the value of the reinforcement signal, the value of the reinforcement signal being one of positive reinforcement or negative reinforcement; and executing a neural network training engine implementing reinforcement training to update the predictive model of the neural network based on:
inputs comprising the at least one current environmental characteristic value, the at least one set point, and the at least one room characteristic;
one or more outputs consisting of the one or more commands; and
the value of the reinforcement signal.

11. The training server of claim 10, wherein the predictive model of the neural network comprises weights of the neural network, and updating the predictive model comprises updating the weights.

12. The training server of claim 10, wherein the at least one room characteristic further comprises at least one of the following: a room type identifier selected among a plurality of room type identifiers, one or more geometric characteristics of the room, and periods of time when the room is occupied by humans.

13. The training server of claim 10, wherein the at least one current environmental characteristic value comprises at least one of the following: a current temperature, a current humidity level, a current carbon dioxide ($CO_2$) level, and a current room occupancy.

14. The training server of claim 10, wherein the at least one updated environmental characteristic value comprises at least one of the following: an updated temperature, an updated humidity level, and an updated carbon dioxide ($CO_2$) level.

15. The training server of claim 10, wherein the at least one set point comprises at least one of the following: a target temperature, a target humidity level, and a target $CO_2$ level.

16. The training server of claim 10, wherein the one or more commands for controlling the appliance include at least one of the following: a command for controlling a speed of a fan, a command for controlling a pressure generated by a compressor, and a command for controlling a rate of an airflow through a valve.

17. The training server of claim 10, wherein the set of rules generates the positive reinforcement or the negative reinforcement in response to an absolute difference between the at least one set point and the at least one updated environmental characteristic value with respect to a threshold.

18. A non-transitory computer program product comprising instructions executable by a processing unit of a training server, the execution of the instructions by the processing unit providing for generating a predictive model of a neural network used for controlling an appliance by:
storing in a memory of the training server a predictive model of a neural network;
storing in the memory a set of rules;
receiving by the processing unit at least one room characteristic, the at least one room characteristic comprising a type of activity performed by humans occupying the room;
receiving by the processing unit at least one current environmental characteristic value and at least one set point from an environment controller via a communication interface of the training server;
determining by the processing unit one or more commands for controlling an appliance based on the at least one current environmental characteristic value, the at least one set point and the at least one room characteristic;
transmitting by the processing unit the one or more commands for controlling the appliance to the environment controller via the communication interface;
receiving by the processing unit at least one updated environmental characteristic value from the environment controller via the communication interface;
determining by the processing unit a value of a reinforcement signal by applying the set of rules to inputs comprising the at least one current environmental characteristic received from the environment controller before generation and transmission to the environment controller of the one or more commands, the at least one set point, the at least one updated environmental characteristic value received from the environment controller after transmission to the environment controller of the one or more commands and the at least one room characteristic, the application of the set of rules generating the value of the reinforcement signal, the value of the reinforcement signal being one of positive reinforcement or negative reinforcement; and
executing by the processing unit a neural network training engine implementing reinforcement training to update the predictive model of the neural network based on:
inputs comprising the at least one current environmental characteristic value, the at least one set point, and the at least one room characteristic;
one or more outputs consisting of the one or more commands; and
the value of the reinforcement signal.

* * * * *